(12) United States Patent
Fujii et al.

(10) Patent No.: US 8,255,624 B2
(45) Date of Patent: Aug. 28, 2012

(54) STORAGE APPARATUS AND ITS CONTROL METHOD

(75) Inventors: Masanori Fujii, Odawara (JP); Tsukasa Nishimura, Odawara (JP); Sumihiro Miura, Odawara (JP); Hiraki Mikami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 203 days.

(21) Appl. No.: 12/668,907

(22) PCT Filed: Dec. 17, 2009

(86) PCT No.: PCT/JP2009/006987
§ 371 (c)(1),
(2), (4) Date: Jan. 13, 2010

(87) PCT Pub. No.: WO2011/074040
PCT Pub. Date: Jun. 23, 2011

(65) Prior Publication Data
US 2011/0271048 A1    Nov. 3, 2011

(51) Int. Cl.
*G06F 12/08* (2006.01)
(52) U.S. Cl. ......... 711/113; 711/103; 711/114; 711/118
(58) Field of Classification Search ........................ None
See application file for complete search history.

(56) References Cited

U.S. PATENT DOCUMENTS

| | | | |
|---|---|---|---|
| 5,519,831 A * | 5/1996 | Holzhammer | 714/22 |
| 2007/0050540 A1 * | 3/2007 | Klein | 711/113 |
| 2007/0061511 A1 * | 3/2007 | Faber | 711/113 |
| 2007/0233979 A1 * | 10/2007 | Beardsley et al. | 711/162 |
| 2007/0288692 A1 * | 12/2007 | Bruce et al. | 711/113 |
| 2008/0104344 A1 | 5/2008 | Shimozono et al. | |
| 2008/0114930 A1 * | 5/2008 | Sanvido et al. | 711/113 |
| 2008/0276040 A1 | 11/2008 | Moritoki et al. | |
| 2009/0077312 A1 | 3/2009 | Miura | |
| 2009/0113149 A1 * | 4/2009 | Kondo et al. | 711/161 |

FOREIGN PATENT DOCUMENTS

| EP | 2 063 361 | 5/2009 |
|---|---|---|
| JP | 2008-276646 | 11/2008 |

OTHER PUBLICATIONS

International Search Report in International Application No. PCT/JP2009/006987 mailed Sep. 7, 2010.
Written Opinion in International Application No. PCT/JP2009/006987 mailed Sep. 7, 2010.

* cited by examiner

*Primary Examiner* — Kaushikkumar Patel
(74) *Attorney, Agent, or Firm* — Brundidge & Stanger, P.C.

(57) ABSTRACT

A storage apparatus and its control method capable of shortening data save time at the time of power shutdown are suggested.

The storage apparatus includes a processor for controlling reading/writing user data from/to a disk device(s), and a cache memory for storing user data sent and received between a channel adapter and a the disk adapter and control data used by the processor, wherein the control data is sorted into and stored in the nonvolatile memory or the volatile memory according to its update frequency.

17 Claims, 18 Drawing Sheets

[Fig. 6]

STORAGE APPARATUS AND ITS CONTROL METHOD

TECHNICAL FIELD

The present invention relates to a storage apparatus and its control method. In particular, the invention is ideal for use in a storage apparatus having a cache memory constituted from a volatile memory and a nonvolatile memory.

BACKGROUND ART

There is a conventional storage apparatus capable of preventing data loss at the time of power shutdown by physically separating a shared memory for storing and retaining control data from a cache memory for temporarily storing user data and by performing battery backup of the shared memory and the cache memory.

There is another storage apparatus that has a cache memory constituted from a volatile memory and a nonvolatile memory and can prevent loss of data stored in the volatile memory by saving data, which has been stored in the volatile memory, in the nonvolatile memory at the time of power shutdown (see, for example, Patent Literature 1).

Citation List

[Patent Literature]
[PTL 1]
Japanese Patent Laid-Open (Kokai) Application Publication No. 2008-276646

SUMMARY OF INVENTION

Technical Problem

However, since the shared memory and the cache memory are physically and logically separated from each other in the former storage apparatus, there is a problem of the requirement for a large-capacity battery for the purpose of battery backup.

With the latter storage apparatus, the amount of data to be saved from the volatile memory to the nonvolatile memory at the time of power shutdown and the amount of data to be returned from the nonvolatile memory to the volatile memory have increased due to the influence of incorporation of multiple functions in recent years. As a result, there is a problem of a large amount of time required for this type of storage apparatus at the time of power shutdown and power reactivation. Since a large amount of time is required at the time of power shutdown as mentioned above, there is another problem of the requirement of a large-capacity battery used to drive a necessary portion at the time of power shutdown.

The present invention was devised in light of the circumstances described above, and it is intended to suggest a storage apparatus and its control method capable of shortening data save time at the time of power shutdown and data recovery time at the time of power reactivation.

Solution to Problem

In order to solve the above-described problems, a storage apparatus for providing a host system with a storage area from or to which user data is read or written according to this invention is characterized in that the storage apparatus includes: a channel adapter serving as an interface with the host system; one or more disk devices for providing the storage area; a disk adapter serving as an interface with the disk device; a processor for controlling reading/writing the user data from/to the disk device; and a cache memory for storing the user data sent and received between the channel adapter and the disk adapter and control data used by the processor; wherein the cache memory includes: a nonvolatile memory; a volatile memory; a memory control circuit for controlling reading/writing the user data or the control data from/to the nonvolatile memory and the volatile memory; and a control unit for saving data, which has been stored in the volatile memory, in the nonvolatile memory at the time of power shutdown or returning the data, which has been saved to the nonvolatile memory, to the volatile memory at the time of power reactivation; and wherein the memory control circuit sorts and stores at least the control data into the nonvolatile memory or the volatile memory according to update frequency of the control data.

Furthermore, a control method for a storage apparatus for providing a host system with a storage area from or to which user data is read or written according to this invention is characterized in that the storage apparatus includes: a channel adapter serving as an interface with the host system; one or more disk devices for providing the storage area; a disk adapter serving as an interface with the disk device; a processor for controlling reading/writing the user data from/to the disk device; and a cache memory for storing the user data sent and received between the channel adapter and the disk adapter and control data used by the processor; and wherein the storage apparatus control method comprises: a first step of sorting and storing at least the control data into the nonvolatile memory or the volatile memory according to update frequency of the control data; and a second step of saving data, which has been stored in the volatile memory, in the nonvolatile memory at the time of power shutdown and returning the data, which has been saved to the nonvolatile memory, to the volatile memory at the time of power reactivation.

Advantageous Effects of Invention

The amount of data to be saved from a volatile memory to a nonvolatile memory at the time of power shutdown and the amount to data to be returned from the nonvolatile memory to the volatile memory at the time of power reactivation can be reduced according to the present invention. Therefore, data save time at the time of power shutdown and data recovery time at the time of power reactivation can be shortened as compared to conventional techniques.

BRIEF DESCRIPTION OF DRAWINGS

FIG. 1 is a block diagram showing the entire configuration of a computer system according to the first embodiment.
FIG. 2 is a conceptual diagram of the packet configuration of a packet exchanged in the storage apparatus.
FIG. 3 is a block diagram showing the configuration of a cache memory.
[FIG. 3]
FIG. 5 is a conceptual diagram showing the schematic configuration of a mapping table.

FIG. 6 is a conceptual diagram showing the data storage configuration of a volatile memory.

FIG. 7 is a conceptual diagram for explaining a virtualization function.

FIG. 8 is a flowchart illustrating a processing sequence for virtualization processing.

FIG. 9 is a flowchart illustrating a processing sequence for data sorting storage processing.

FIG. 10 is a flowchart illustrating a processing sequence for I/O processing.

FIG. 11 is a flowchart illustrating a processing sequence for data save processing at the time of power shutdown.

FIG. 12 is a flowchart illustrating a processing sequence for data return processing at the time of power activation.

FIG. 13 is a block diagram showing the entire configuration of a computer system according to the second embodiment.

FIG. 14 is a conceptual diagram for explaining remote copying.

FIG. 15 is a flowchart illustrating a processing sequence for remote copy processing.

FIG. 16 is a block diagram showing the entire configuration of a computer system according to the third embodiment.

FIG. 17 is a flowchart illustrating a processing sequence for data sorting processing.

FIG. 18 is a block diagram showing the entire configuration of a computer system according to the fourth embodiment.

FIG. 19 is a flowchart illustrating a processing sequence for cache write error processing.

FIG. 20 is a flowchart illustrating a processing sequence for cache read error processing.

Figure 1:
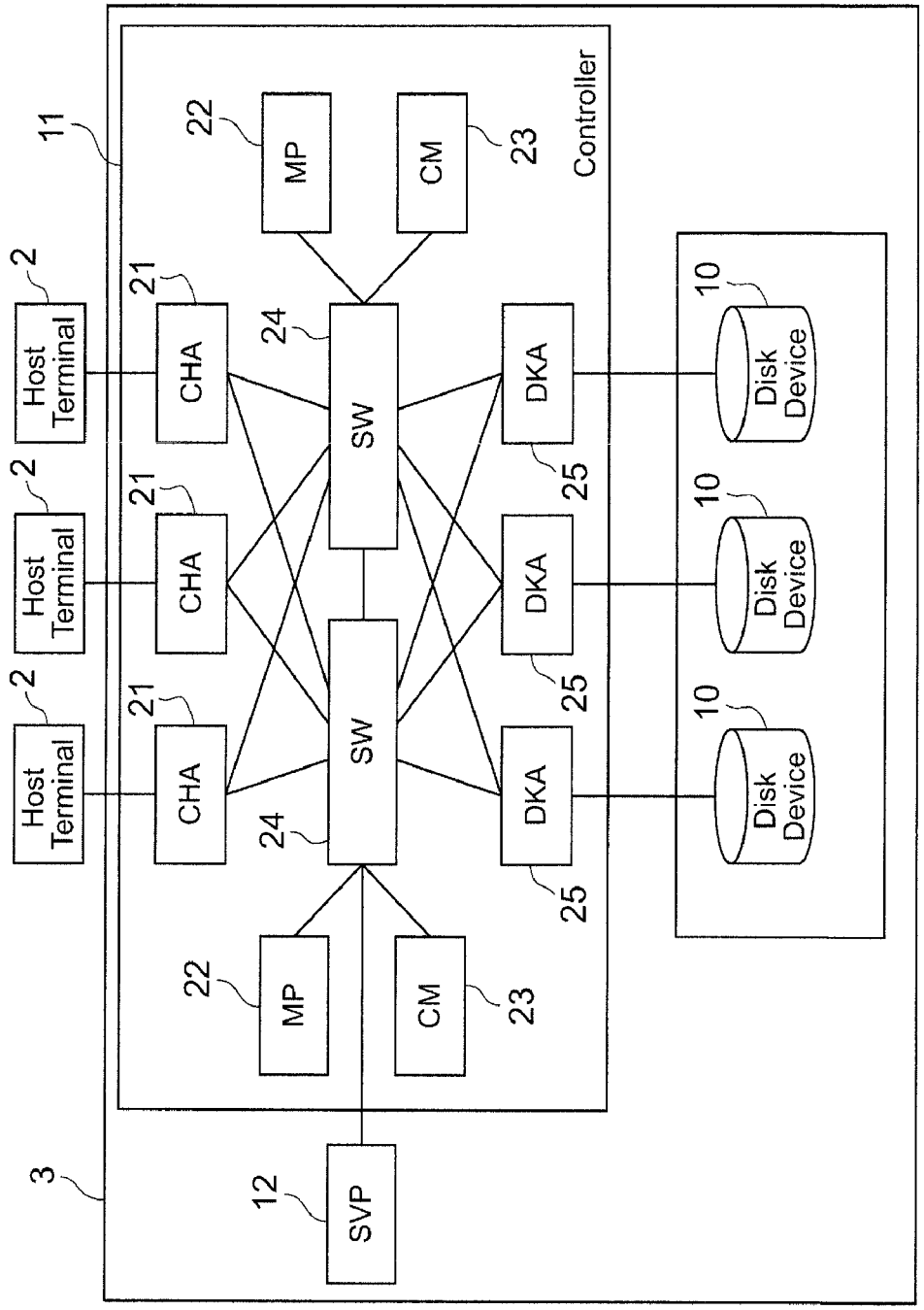
[FIG. 1]

REFERENCE SIGNS LIST 1, 50, 60, 70 Computer system
2 Host terminal
3, 51, 61, 71 Storage apparatus
10 Disk device
11, 52, 62, 72 Controller
12 Service processor (SVP)
21, 63 Channel adapter
22, 53, 73 Microprocessor
23, 65 Cache memory
25, 64 Disk adapter
231, 651 Memory control circuit
232 Volatile memory module
233 Nonvolatile memory
235 Microcomputer
2311, 6511 Packet transmitter-receiver
2313 Volatile memory control unit
2315 Nonvolatile memory control unit
[Description Of Embodiments]

An embodiment of the present invention will be explained below with reference to the attached drawings.

(1) First Embodiment (1-1) Physical Configuration of Computer System According to this Embodiment Referring to FIG. 1, reference numeral "1" represents a computer system as a whole according to the first embodiment. The computer system 1 is constituted from a plurality of host terminals 2 and a storage apparatus 3 as shown in FIG. 1.

The host terminal 2 is a computer device equipped with information processing resources such as a CPU (Central Processing Unit) and a memory, and is composed of, for example, a personal computer, a workstation, or a mainframe.

The storage apparatus 3 includes one or more disk devices 10, a controller 11 for controlling data input/output to/from the disk devices 10, and a service processor (hereinafter referred to as "SVP") 12.

The disk devices 10 are constituted from, for example, expensive disks such as SCSI (Small Computer System Interface) disks or inexpensive disks such as SATA (Serial AT Attachment) disks. One or more logical volumes are set in physical storage areas (hereinafter referred to as the "real storage areas") provided by one or more disk units 20. Data from the host terminal 2 is stored by block of a specified size in this logical volume (hereinafter referred to as the "logical block").

Each logical volume is given its unique volume number. In this embodiment, data is input or output by designating the relevant address which is a combination of the volume number and a block number assigned to each logical block (LBA: Logical Block Address).

Incidentally, regarding logical volumes provided by this storage apparatus 3 to the host terminals 2, there are a substantial logical volume(s) as described above and a virtual logical volume(s) which is not substantial (hereinafter referred to as the "virtual volume(s)").

The controller 11 is a system circuit for generally controlling input-output processing between the host terminal 2 and the disk device 10. Specifically speaking, the controller 11 includes a plurality of channel adapters 21, a plurality of microprocessors 22, a plurality of cache memories 23, a plurality of internal switches 24, and a plurality of disk adapters 25. The channel adapters 21, the microprocessors 22, the cache memories 23, and the disk adapters 25 are connected to each other via the internal switches 24.

Each channel adapter 21 is constituted from information processing resources such as a microprocessor and a memory and servers as an interface with the host terminal 2.

Each microprocessor 22 is a processor for controlling the entire controller 11 and executes various processing described later in accordance with control programs stored in a local memory (not shown in the drawing).

Each cache memory 23 is mainly used to temporarily store data exchanged between the host terminal 2 and the disk device 10 (hereinafter referred to as the "user data") and store various kinds of control data used by the microprocessor 22 when executing various processing.

Each internal switch 24 is constituted from, for example, a crossbar switch. Each internal switch 24 switches a path, thereby constructing a path between the channel adapter 21, the microprocessor 22, the cache memory 23, and the disk adapter 25.

Each disk adapter 25 is constituted from information processing resources such as a microprocessor and a memory and serves as an interface with a disk unit 4. Incidentally, the disk adapter 25 may include a nonvolatile memory. The disk adapter 25 is connected to the corresponding disk device 10 via, for example, a Fibre Channel cable and receives and delivers data from and to the disk device 10 according to Fibre Channel protocol.

The SVP 12 is a computer device for maintaining and managing the storage apparatus 3. The SVP 12 provides a system administrator with a user interface for performing various operations necessary for maintenance and management. For example, the SVP 12 sets a pool volume or a virtual volume as described later and make various mode settings for the storage apparatus 3 as operated by the system administrator.

Figure 2:
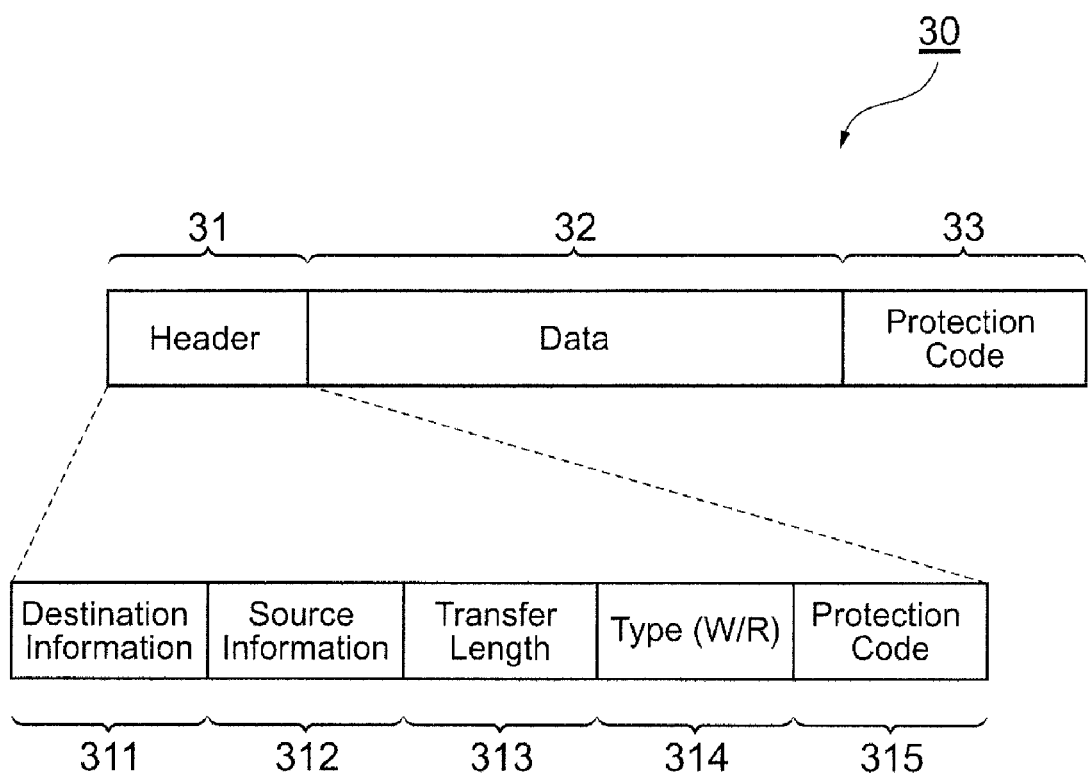
[FIG. 2]

Incidentally, FIG. 2 shows a transfer format of user data and control data in the storage apparatus 3. As shown in FIG. 2, the user data and the control data are packetized in storage apparatus 3 into a packet 30 constituted from a header field 31, a data field 32, and a protection code field 33 and are transferred in the packet 30.

In this case, the header field 31 is a field that stores the header information about the packet 30 and is constituted from a destination information field 311, a source information field 312, a transfer length field 313, a type field 314, and a protection code field 315.

The destination information field 311 stores destination information indicating the destination of the packet 30 and the source information field 312 stores source information indicating the sender of the packet 30. The transfer length field 313 stores the transfer length indicating the length of the user data or control data stored in that packet 30; and when the data stored in the packet 30 is the user data, the type field 314 stores type information indicating whether the user data is write data or read data. Furthermore, the protection code field 315 stores a protection code such as CRC (Cyclic Redundancy Check) to correct a code error in the header information stored in the header field.

The data field 32 stores the user data or the control data to be transferred and the protection code field 33 stores a protection code such as an ECC (Error Correcting Code) to detect an error that occurs in the packet 30 while transferring the packet.

The user data and the control data are exchanged in the packet 30 generated as described above between the channel adapter 21 and the cache memory 23, between the cache memory 23 and the disk adapter 25, and between the microprocessor 22 and the cache memory 23.

Figure 3:
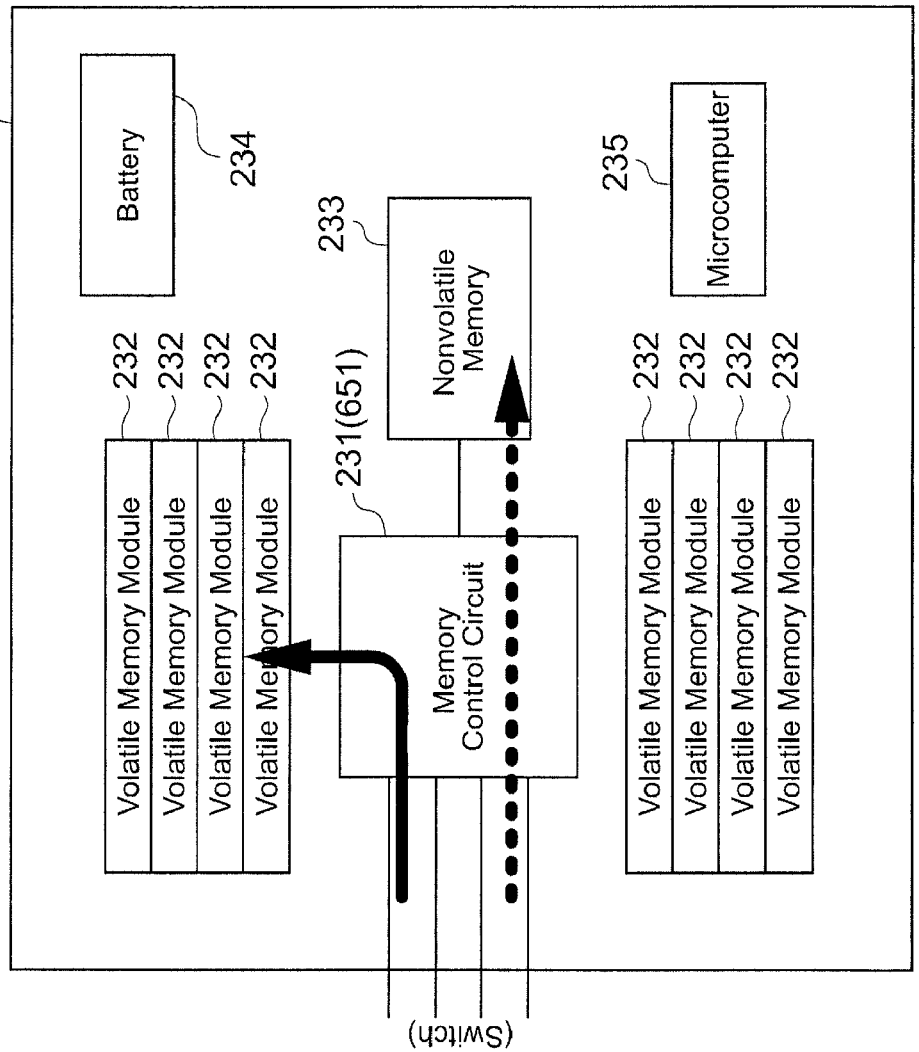
[FIG. 3]

FIG. 3 shows the specific configuration of the cache memory 23. As shown in FIG. 3, the cache memory 23 is constituted from a memory control circuit (Large Scale Integration) 231, a plurality of volatile memory modules 232, a nonvolatile memory 233, a battery 234, and a microcomputer 235.

Figure 4:
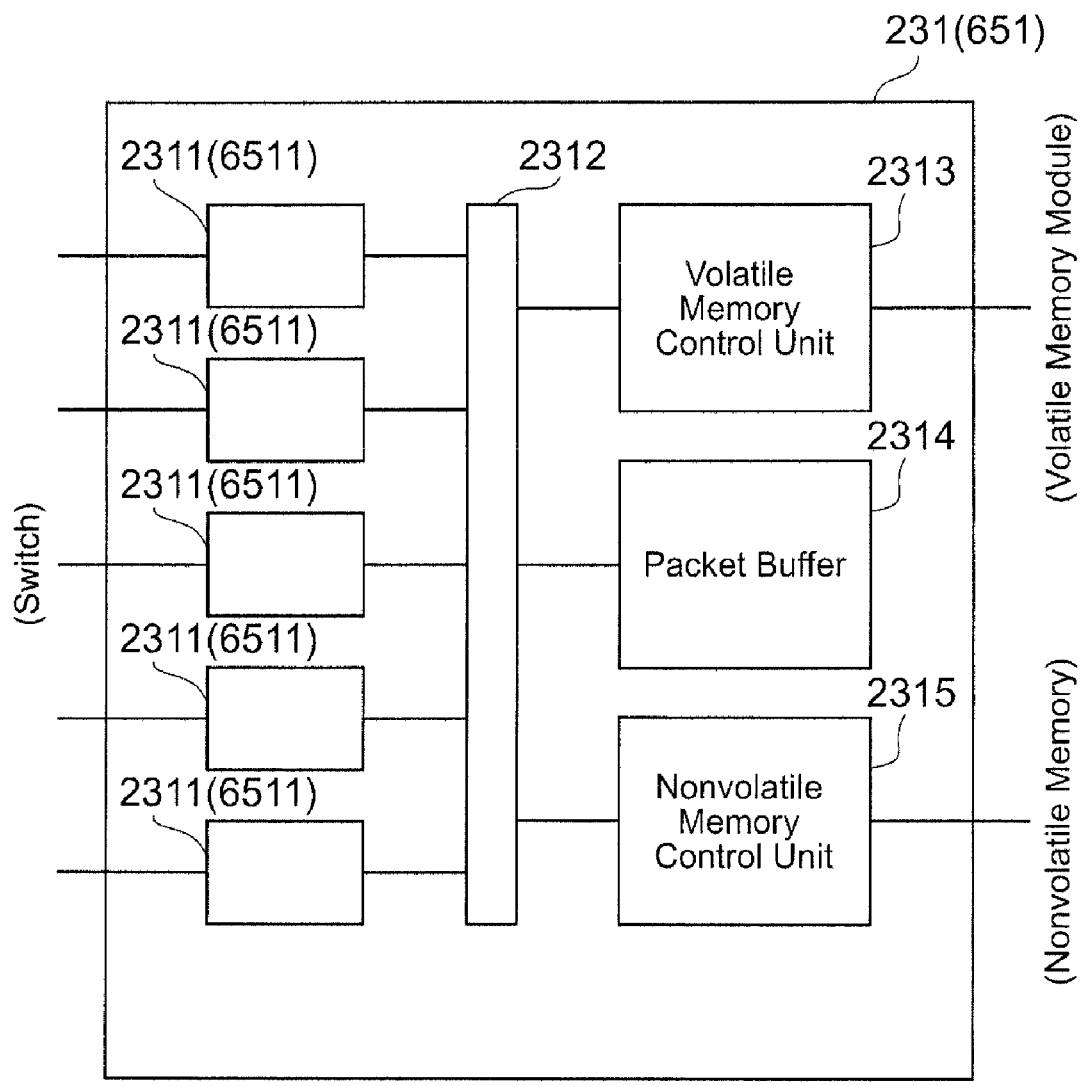
FIG. 4 is a block diagram showing the configuration of a memory control circuit.

The memory control circuit 231 includes a plurality of packet transmitter-receivers 2311, a packet sorter 2312, a volatile memory control unit 2313, a packet buffer 2314, and a nonvolatile memory control unit 2315 as shown in FIG. 4.

The packet transmitter-receiver 2311 sends/receives the packet 30 (FIG. 2) between the internal switches 24 and the volatile memory module 232 or the nonvolatile memory 233.

The packet sorter 2312 sorts the packet 30 to the volatile memory control unit 2313 or the nonvolatile memory control unit 2315 based on the destination information stored in the header field 31 in the packet 30 output from the packet transmitter-receiver 2311. The packet sorter 2312 also sends the packet 30 from the volatile memory control unit 2313 or the nonvolatile memory control unit 2315 to the packet transmitter-receiver 2311.

The volatile memory control unit 2313 is a memory controller for controlling reading/writing data from/to the volatile memory module 232 and reads/writes data stored in the packet 30, which is sorted by the packet sorter 2312 to the volatile memory module 232 as the destination, from/to the volatile memory module 232.

The packet buffer 2314 is a memory for temporarily storing the packet 30 (FIG. 2) in the volatile memory module 232 or the nonvolatile memory 233. If the nonvolatile memory 233 is a flash memory as described later, data is read/written in units of 4 kb from/to the nonvolatile memory 233. So, data to be stored in the nonvolatile memory 233 is first accumulated in the packet buffer 2314 as much as the amount of a unit (for example, 4 kb) read/written from/to the flash memory and then collectively read and stored in the nonvolatile memory 233.

The nonvolatile memory control unit 2315 is a memory controller for controlling reading/writing data from/to the nonvolatile memory 233 and reads/writes data stored in the packet 30, which is sorted by the packet sorter 2312 to the nonvolatile memory 233 as the destination, from/to the nonvolatile memory 233.

The volatile memory module 232 is constituted from a memory that cannot keep storing or retaining data unless power is supplied from a power source such as a DIMM (Dual Inline Memory Module). The volatile memory module 232 stores, for example, the user data and the control data whose update frequency is high, from among the control data used by the microprocessor 22 for various kinds of control.

The nonvolatile memory 233 is constituted from a memory, such as a flash memory, capable of keeping storing and retaining data without power supply from a power source. The nonvolatile memory 233 stores the control data whose update frequency is low, from among the control data used by the microprocessor 22 for various kinds of control.

The battery 234 is used to supply power to each module in the cache memory 23 at the time of power shutdown.

The microcomputer 235 has a function that saves data, which has been stored and retained in the volatile memory module 232, to the nonvolatile memory 233 at the time of power shutdown and returns the data, which has been saved to the nonvolatile memory 233, to the volatile memory module 232 at the time of power reactivation.

Figure 5:
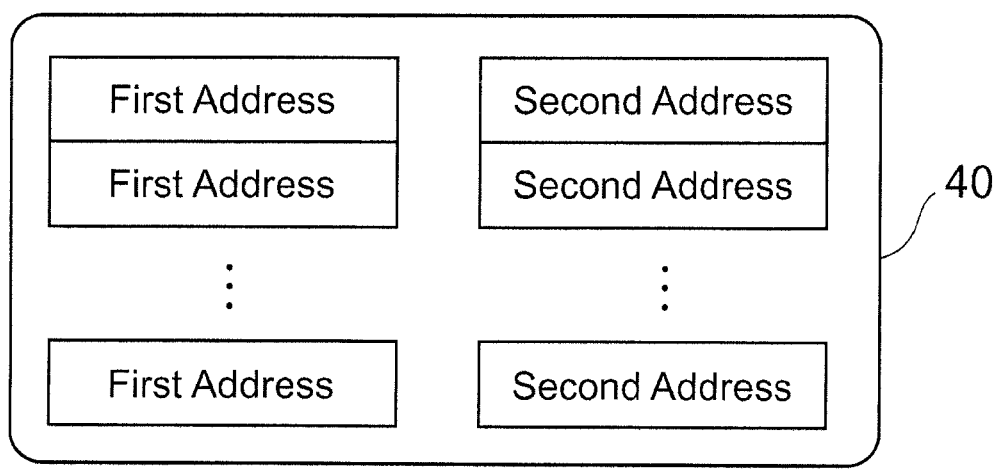
[FIG. 5]

Incidentally, in this embodiment, the channel adapter 12; the microprocessor 22, and the disk adapter 25, and the nonvolatile memory control unit 2315 manage storage areas in the nonvolatile memory 233 by using different addresses in different memory spaces. Accordingly, in this embodiment, the nonvolatile memory control unit 2315 retains a mapping table 40 as shown in FIG. 5 that associates the address of a storage area in the nonvolatile memory 233 as recognized by the microprocessor 22 (hereinafter referred to as the "first address") with the address of the storage area in the nonvolatile memory 233 as recognized by the nonvolatile memory control unit 2315 (hereinafter referred to as the "second address").

Figure 6:
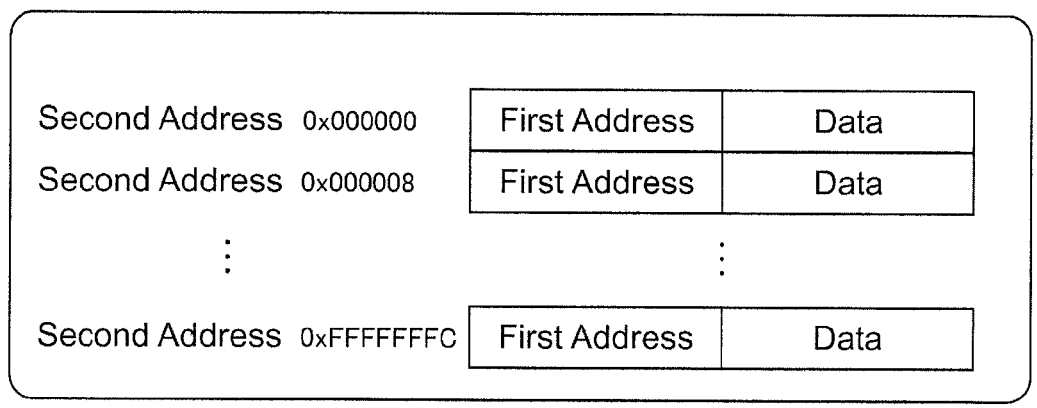
[FIG. 6]

When the packet 30 (FIG. 2) is sorted from the packet transmitter-receiver 2311 to the nonvolatile memory control unit 2315, the nonvolatile memory control unit 2315 refers to the mapping table 40, converts the first address (the address recognized by the microprocessor 22) contained in the destination information stored in the header field 31 (FIG. 2) of the packet 30 into the second address recognized by the nonvolatile memory control unit 2315, and stores the user data or the control data, to which the first address is added as shown in FIG. 6, at the position of the second address in the nonvolatile memory 233.

(1-2) Virtualization Function

Next, a virtualization function of the storage apparatus 3 will be explained. The storage apparatus 3 has the virtualization function that virtualizes the storage area provided by the disk devices 10 and provides the virtualized storage area to the host terminal 2.

Figure 7:
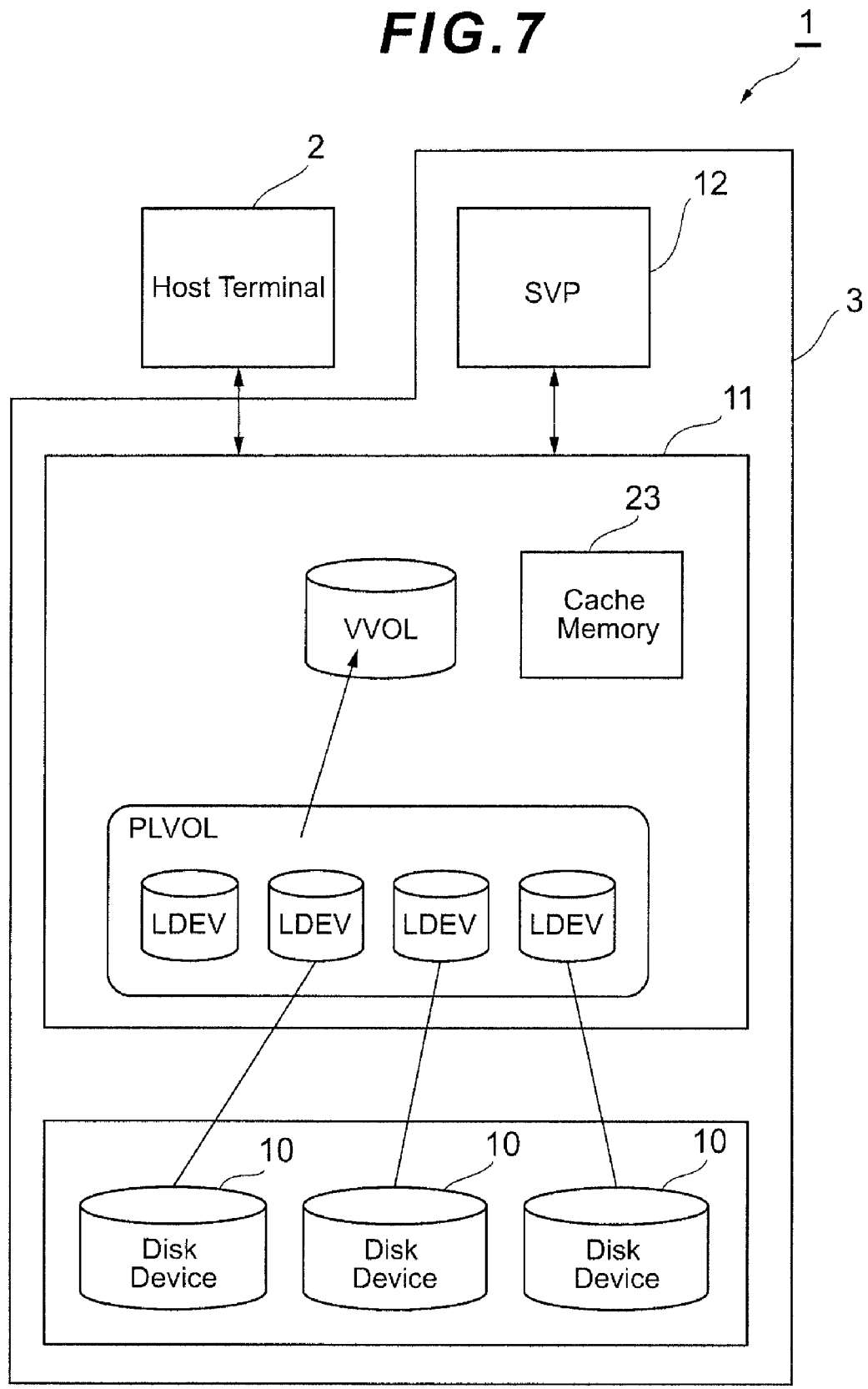
[FIG. 7]

In fact, the storage apparatus 3 manages one or more disk devices 10 as one logical device LDEV according to user settings as shown in FIG. 7 and manages real storage areas provided by one or more logical device LDEV as one pool volume PLVOL. This pool volume PLVOL is associated with one or more virtual volumes VVOL.

When the host terminal 2 makes a write request to the virtual volume VVOL or sends the user data to write, a necessary amount of the real storage area is allocated from the corresponding pool volume PLVOL to the storage area designated by the write request in the virtual volume VVOL designated by the write request, and the user data is then written to that real storage area (more precisely, the disk devices 10 providing the real storage area).

In this case, the user data to write which is given by the host terminal 2 is temporarily stored in the cache memory 23 in the storage apparatus 3 when it is read/write from/to the real storage area. The cache memory 23 also stores various kinds of control data used by the microprocessor 22 for various control processing.

One of the characteristics of the storage apparatus 3 according to this embodiment is that the user data stored in the cache memory 23 as described above and the control data whose update frequency is high, from among the control data stored in the cache memory 23, are stored and retained in the nonvolatile memory 233 (FIG. 3) in the cache memory 23 and other control data is stored and retained in the volatile memory module 232 (FIG. 3) in the cache memory 23.

As a result, the storage apparatus 3 can enhance the accessibility to the user data and the control data whose update frequency is high and reduce the amount of data (the user data and part of the control data), which has been stored in the volatile memory module 232, to be saved to the nonvolatile memory 233 at the time of power shutdown by storing and retaining the user data and the control data whose update frequency is high, in the volatile memory module 232 which realizes a higher access speed than that of the nonvolatile memory 233.

(1-3) Various Processing in Storage Apparatus
(1-3-1) Virtualization Processing

Figure 8:
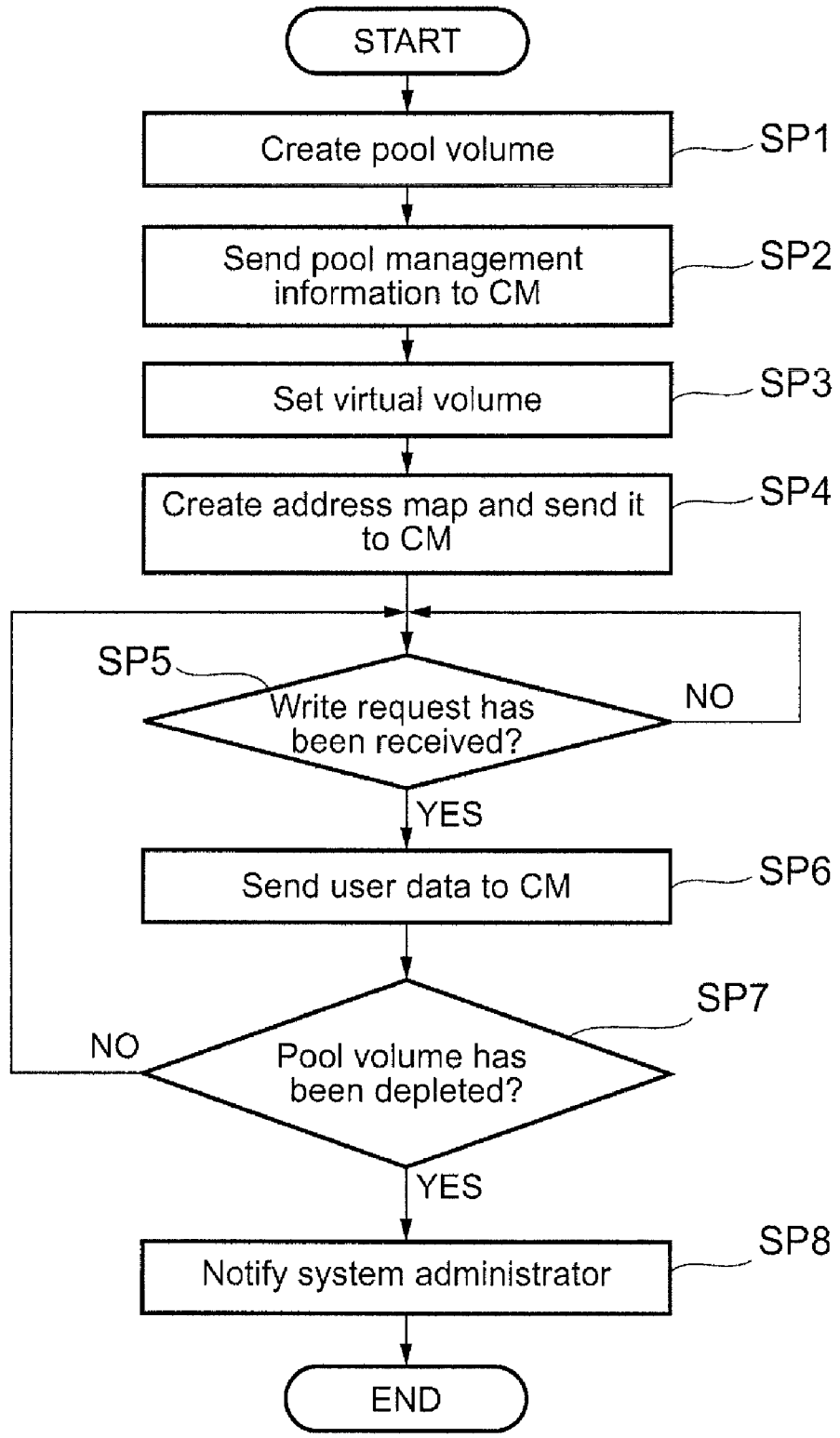
[FIG. 8]

FIG. 8 shows a processing sequence for virtualization processing executed by the microprocessor 22 (FIG. 1) in association with the above-described e virtualization function. The microprocessor 22 creates the pool volume PLVOL and the virtual volume VVOL in accordance with the virtualization processing shown in FIG. 8, allocates the real storage area to the corresponding part of the virtual volume VVOL in response to the request from the host terminal 2 to write the user data to the created virtual volume VVOL, and writes the user data to the allocated real storage area.

Specifically speaking, after the system administrator operates the SVP 12 to command the creation of the pool volume PLVOL, the microprocessor 22 starts this virtualization processing and first creates one pool volume PLVOL by putting together the real storage areas provided by one or more logical devices LDEVs then designated by the system administrator (SP1).

Subsequently, the microprocessor 22 creates control data for managing the pool volume PLVOL (hereinafter referred to as the "pool management information") including identification information about each of the logical devices LDEV constituting the then created pool volume PLVOL and identification information about each of the disk devices 10 constituting each logical device LDEV and packetizes and sends the pool management information to the cache memory 23 (SP2). As a result the pool management information is then stored in the cache memory 23 in accordance with the procedure described later with reference to FIG. 9.

Next, the microprocessor 22 sets the virtual volume VVOL associated with the pool volume PLVOL based on input information input by the system administrator by operating the SVP 12 (SP3), and then creates control data for associating the storage area in this virtual volume VVOL with the real storage area in the pool volume PLVOL (hereinafter referred to as the "address map"). The microprocessor 22 also packetizes data of the created address map and sends the packet to the cache memory 23 (SP4). As a result, the address map is stored in the cache memory in accordance with the procedure described later with reference to FIG. 9.

By means of the processing steps SP1 through SP4, the pool volume PLVOL and the virtual volume VVOL associated with the pool volume PLVOL are set in the storage apparatus 3. Subsequently, the microprocessor 22 waits for a write request from the host terminal 2 to the virtual volume VVOL (SP5).

When any of the host terminals 2 makes a write request that designates the virtual volume VVOL as the destination to write the user data, the microprocessor 22 allocates the real storage area from the pool volume PLVOL to the storage area in the virtual volume VVOL as designated by the write request. The microprocessor 22 also controls the channel adapter 21 to transfer the received user data to write to the cache memory 23 (SP6).

As a result, the channel adapter 21 packetizes and sends the user data to the cache memory 23. Then, the user data is stored via the cache memory 23 in the real storage area allocated to the storage area in the virtual volume VVOL which is designated as the destination to write the user data in accordance with the procedure described later with reference to FIG. 9.

Subsequently, the microprocessor 22 judges whether all the real storage areas in the pool volume PLVOL have been allocated to the virtual volume VVOL or not (SP7).

If a negative judgment is returned in step SP7, the microprocessor 22 returns to step SP5 and then repeats the loop of steps SP5 through SP7 and then back to step SP5.

If an affirmative judgment is finally returned in step SP7 by finishing allocating all the real storage areas in the pool volume PLVOL to the virtual volume VVOL, the microprocessor 22 notifies the system administrator to that effect (SP8) and then terminates this virtualization processing.

(1-3-2) Data Sorting Storage Processing

Figure 9:
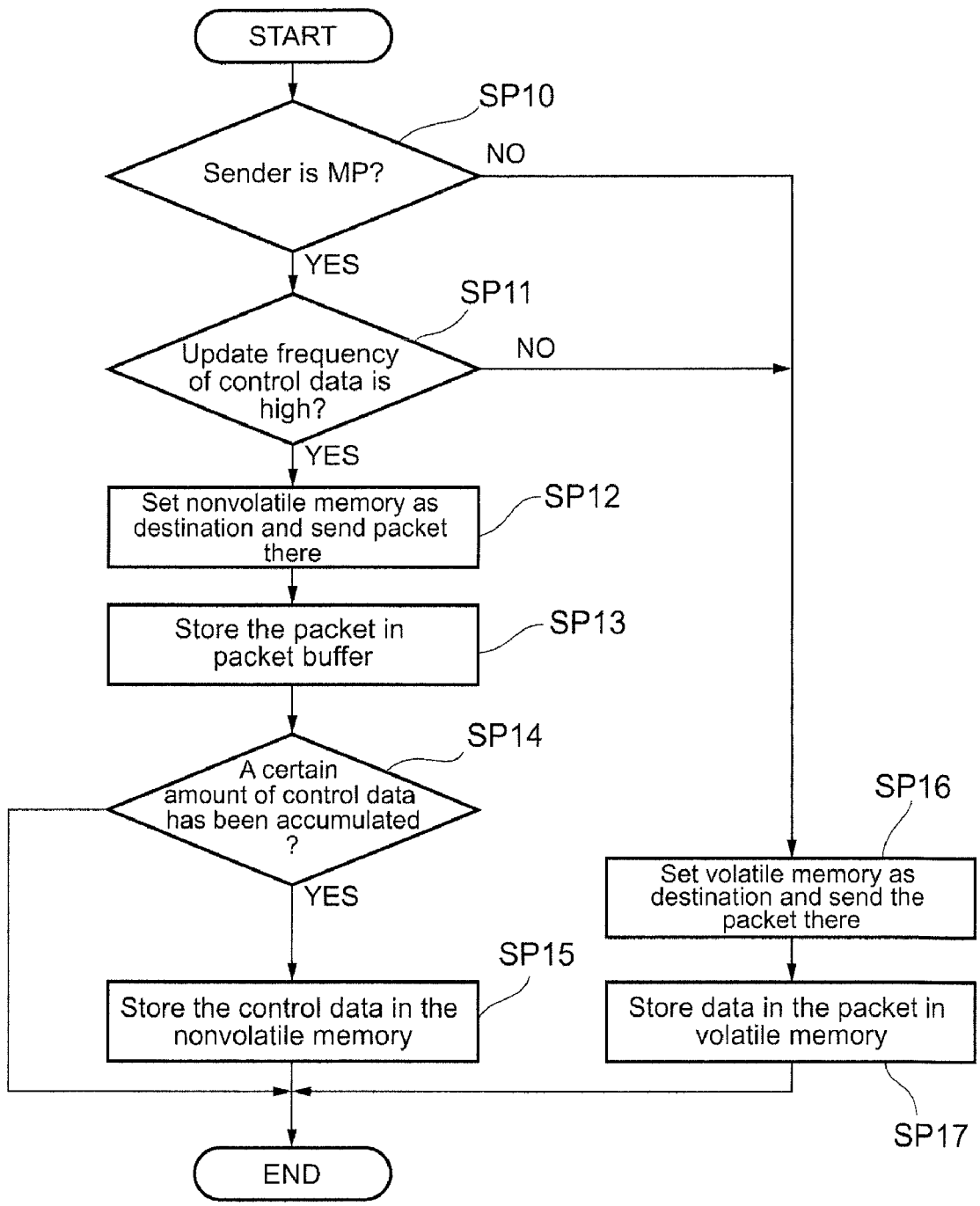
[FIG. 9]

FIG. 9 shows a processing sequence for data sorting storage processing executed by the cache memory 23 that has received the packet 30 (FIG. 2) storing the control data sent from the microprocessor 22 in step SP2 or SP4 of the above-described virtualization processing (FIG. 8), or the packet 30 storing the user data sent from the channel adapter 21 under the control of the microprocessor 22 in step SP6 of the virtualization processing.

When the packet transmitter-receiver 2311 (FIG. 4) in the cache memory 23 receives the packet 30, this data sorting storage processing is started. The packet transmitter-receiver 2311 first judges, based on the source information stored in the header field 31 (FIG. 2) of the packet 30, the whether the sender of the packet 30 is the microprocessor 22 or not (SP10).

An affirmative judgment in SP10 means that the data stored in that packet 30 is the control data, while a negative judgment in SP10 means that the data stored in that packet 30 is the user data.

Accordingly, if an affirmative judgment is returned in step SP10, the packet transmitter-receiver 2311 then judges whether or not the control data stored in the packet 30 is control data whose update frequency is high (for example, the address map) (SP11).

Specifically speaking, in the case of this embodiment, the source information field 312 in the header field 31 of the packet 30 stores, in addition to the source information indicating the sender of that packet 30, information about the control data stored in the packet 30 to distinguish the control data whose update frequency is high from other control data (hereinafter referred to as the "data type distinction information"). This data type distinction information is stored by the microprocessor 22 when generating the packet 30 based on information that is given in advance by, for example, a system designer to the microprocessor 22 and designates the control data whose update frequency is high.

Accordingly, in step SP11, the packet transmitter-receiver 2311 judges, based on the above-described data type distinction information stored in the source information field 312 of the packet 30, whether or not the control data stored in the packet 30 is control data whose update frequency is high.

If an affirmative judgment is returned in SP11, the packet transmitter-receiver 2311 rewrites the destination of the packet 30, which is stored in the destination information field 311 in the header field 31 of the packet 30, to the nonvolatile memory 233 (FIG. 3) and then sends the packet 30 to the nonvolatile memory control unit 2315 (SP12).

After receiving the packet 30, the nonvolatile memory control unit 2315 stores the received packet 30 in the packet buffer 2314 (FIG. 4) (SP13) and then judges whether or not a certain amount of control data (for example, 4 kb) has been stored in the packet buffer 2314 (SP14).

If a negative judgment is returned in SP14, the nonvolatile memory control unit 2315 terminates this processing. As a result, this sequence of data sorting storage processing is terminated.

On the other hand, if an affirmative judgment is returned in step SP14, the nonvolatile memory control unit 2315 extracts the control data from each packet 30 stored in the packet buffer 2314, stores this control data in the nonvolatile memory 233 (SP15), and then terminates this processing. As a result, this sequence of data sorting storage processing is terminated.

On the other hand, if a negative judgment is returned in step SP10 or SP11, the packet transmitter-receiver 2311 rewrites the destination of the packet 30, which is stored in the destination information field 311 in the header field 31 of the packet 30, to the volatile memory module 232 (FIG. 3) and then sends the packet 30 to the volatile memory control unit 2313 (FIG. 4) (SP16).

After receiving the packet 30, the volatile memory control unit 2313 stores the data contained in this, packet 30 (the user data or the control data whose update frequency is high) in the volatile memory module 232 (SP17), and then terminates this processing. As a result, this sequence of data sorting storage processing is terminated.

Incidentally, the above-described data sorting storage processing is processing executed when the cache memory 23 receives the packet 30 even in cases other than the reception of the packet 30 (FIG. 2) from the microprocessor 22 in step SP62 or SP4 of the virtualization processing (FIG. 8) or the reception of the packet 30 from the channel adapter 21 in step SP6 of the virtualization processing.

(1-3-3) I/O Processing

Figure 10:
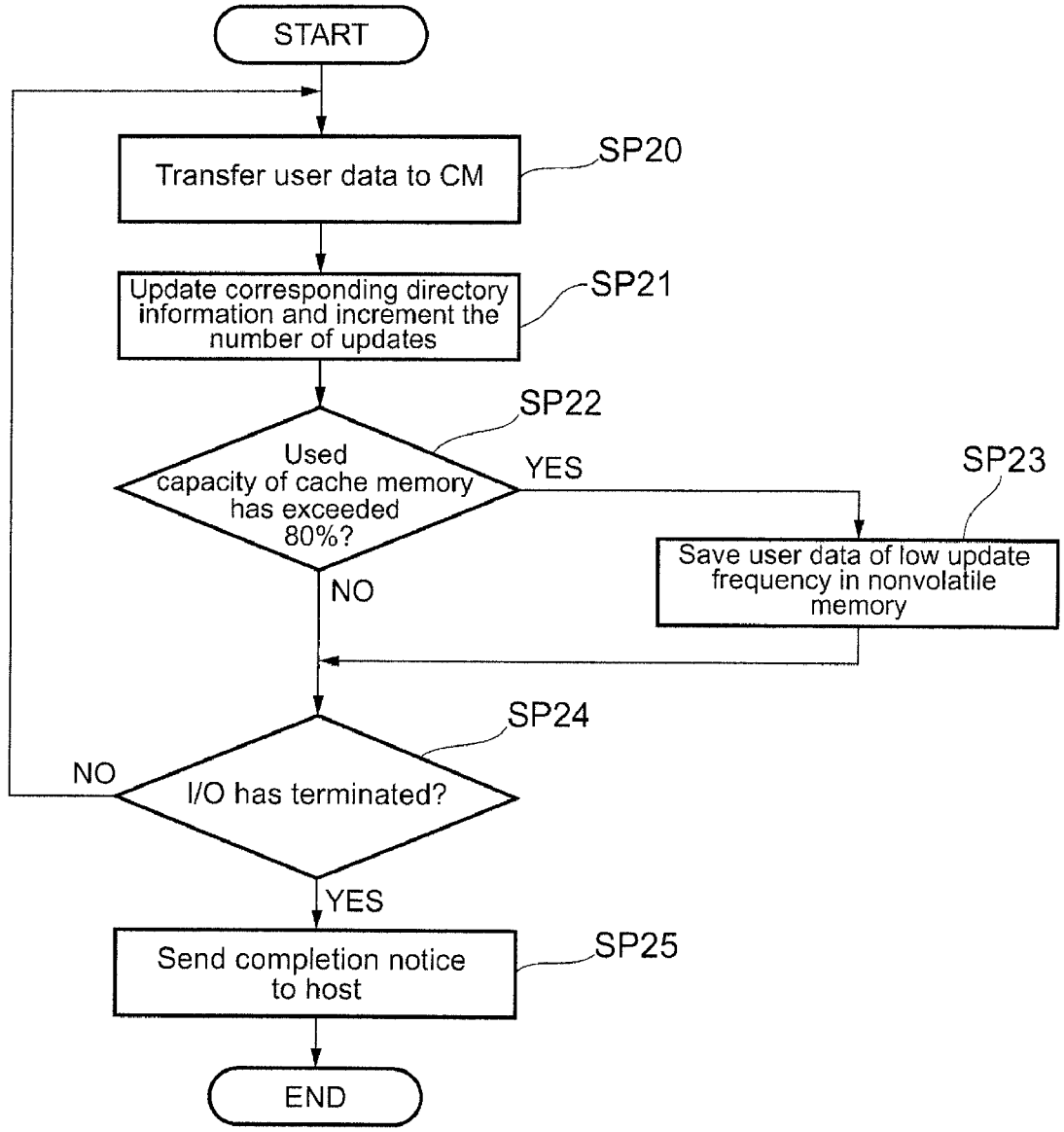
[FIG. 10]

On the other hand, FIG. 10 shows the specific details of processing executed by the microprocessor 22 in step SP 6 of the above-described virtualization processing with reference to FIG. 8.

When the microprocessor 22 proceeds to step SP6 of the virtualization processing, it starts I/O processing shown in FIG. 10 and controls the channel adapter 21 to transfer the user data to write, which has been sent from the host terminal 2, to the cache memory 23 (SP20).

Next, the microprocessor 22 updates directory information corresponding to the user data transferred to the cache memory 23 from among various pieces of directory information stored in the volatile memory module 232 for the cache memory 23. Incidentally, the directory information is management information for managing the current storage location of the user data written to the virtual volume VVOL and is created for each piece of user data. The microprocessor 22 also counts the number of updates of each piece of user data written to the virtual volume VVOL and increments the number of updates of the user data by one along with the update of the directory information (SP21).

Subsequently, the microprocessor 22 judges whether the used capacity of the cache memory 23 has exceeded 80% of the total capacity of the cache memory 23 (SP22).

If an affirmative judgment is returned in SP22, the microprocessor 22 controls the volatile memory control unit 2313 and the nonvolatile memory control unit 2315 for the cache memory 23 to migrate the user data with the smallest number of updates from the volatile memory module 232 to the nonvolatile memory 233 based on the count value for the number of updates for each piece of user data as described above (SP23).

On the other hand, if a negative judgment is returned in step 22, the microprocessor 22 judges whether the processing for writing the received user data has been completed or not (SP24). If a negative judgment is returned in step SP24, the microprocessor 22 returns to step 20 and then repeats the same processing until an affirmative judgment is returned in step SP24.

Subsequently, after completion of the user data write processing, the microprocessor 22 sends a completion notice to the host terminal 2 which is the sender of the user data (SP25) and then terminates this I/O processing.

Incidentally, also when the host terminal 2 makes a read request, the microprocessor 22 reads the designated user data from the disk device 10 and sends it to the host terminal 2 via the cache memory 23 in accordance with the processing sequence shown in FIG. 10.

(1-3-4) Data Save Processing at the Time of Power Shutdown

Figure 11:
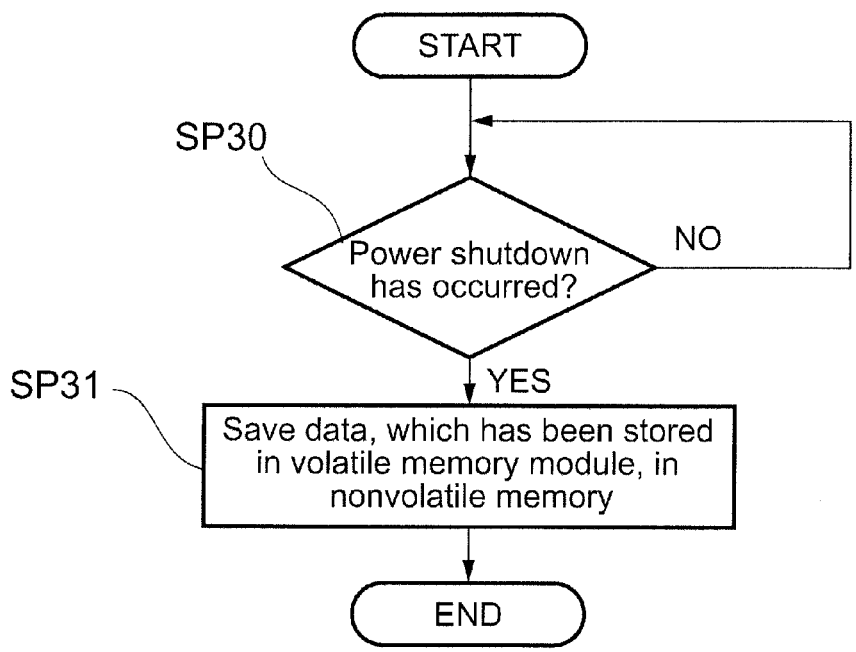
[FIG. 11]

FIG. 11 shows a processing sequence for data save processing executed by the microcomputer 235 for the cache memory 23 (FIG. 3). When power shutdown occurs, the microcomputer 235 saves the user data and control data, which are stored in the volatile memory module 232, to the nonvolatile memory 233 in accordance with the processing sequence shown in FIG. 11.

Specifically speaking, the microcomputer 235 always monitors whether power shutdown has occurred or not (SP30); and if the microcomputer 235 detects the occurrence of power shutdown, it controls the volatile memory control unit 2313 and the nonvolatile memory control unit 2315 for the memory control circuit 231 (FIG. 3) so that the user data and control data which are stored in the volatile memory module 232 are saved to the nonvolatile memory 233 via the memory control circuit 231 (SP31). The microcomputer 235 then terminates this data save processing.

(1-3-5) Data Return Processing at the Time of Power Reactivation

Figure 12:
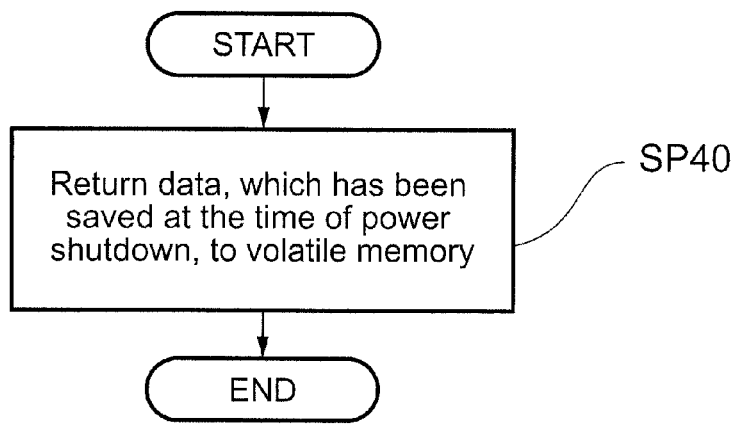
[FIG. 12]

FIG. 12 shows a processing sequence for data return processing executed by the microcomputer 235 for the cache memory 23 at the time of power reactivation. For example, when the power is reactivated after the power shutdown, the microcomputer 235 returns the user data and the control data whose update frequency is high, which have been saved to the nonvolatile memory 233, to the volatile memory module 232 in accordance with the processing sequence shown in FIG. 11.

Specifically speaking, when the power is reactivated, the microcomputer 235 controls the volatile memory control unit 2313 and the nonvolatile memory control unit 2315 for the memory control circuit 231 so that the user data and the control data whose update frequency is high, which are stored in the nonvolatile memory 233, are migrated via the memory control circuit 231 to the volatile memory module 232 (SP40). The microcomputer 235 then terminates this data return processing.

(1-4) Advantageous Effects of this Embodiment

The computer system 1 according to this embodiment is designed as described above so that in the storage apparatus 3, the user data and the control data whose update frequency is high are stored and retained in the volatile memory module 232 in the cache memory 23 and other control data is stored in the nonvolatile memory 233 in the cache memory 23. Therefore, it is possible to reduce the amount of data to be saved from the volatile memory module 232 to the nonvolatile memory 233 at the time of power shutdown and the amount of data to be returned from the nonvolatile memory 233 to the volatile memory module 232 at the time of power reactivation thereafter.

As a result, this computer system 1 can shorten data save time at the time of power shutdown and data recovery time at the time of power reactivation as compared to the conventional techniques. The computer system 1 can also enhance accessibility to the user data and the control data whose update frequency is high.

(2) Second Embodiment

Figure 13:
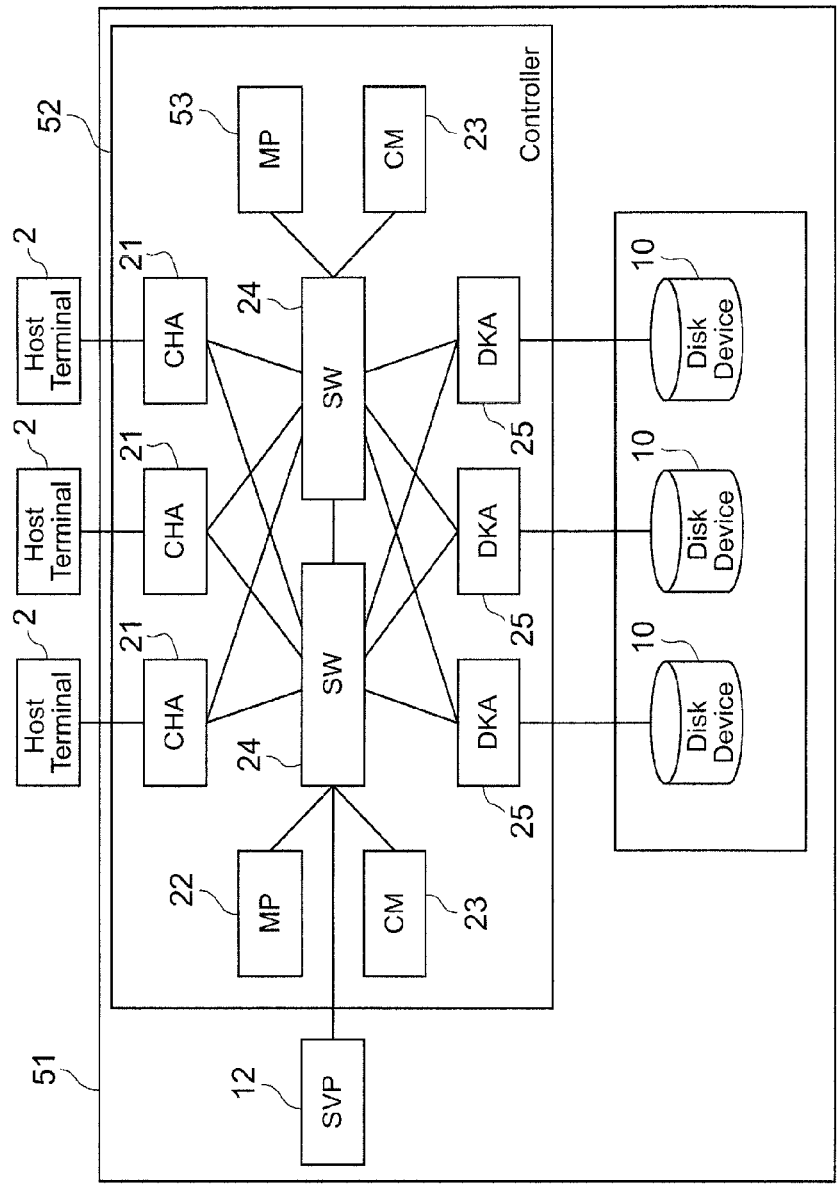
[FIG. 13]

FIG. 13, which indicates elements corresponding to those in FIG. 1 by giving them the same reference numerals as those in FIG. 1, shows a computer system 50 according to the second embodiment. This computer system 50 is configured in the same manner as the computer system 1 according to the first embodiment, except that a storage apparatus 51 has a remote copy function.

The remote copy function herein means a function that copies (by means of remote copying) user data to a storage apparatus on a secondary side, which is provided separately from a storage apparatus on a primary side, when the user data is written to the storage apparatus on the primary side.

Figure 14:
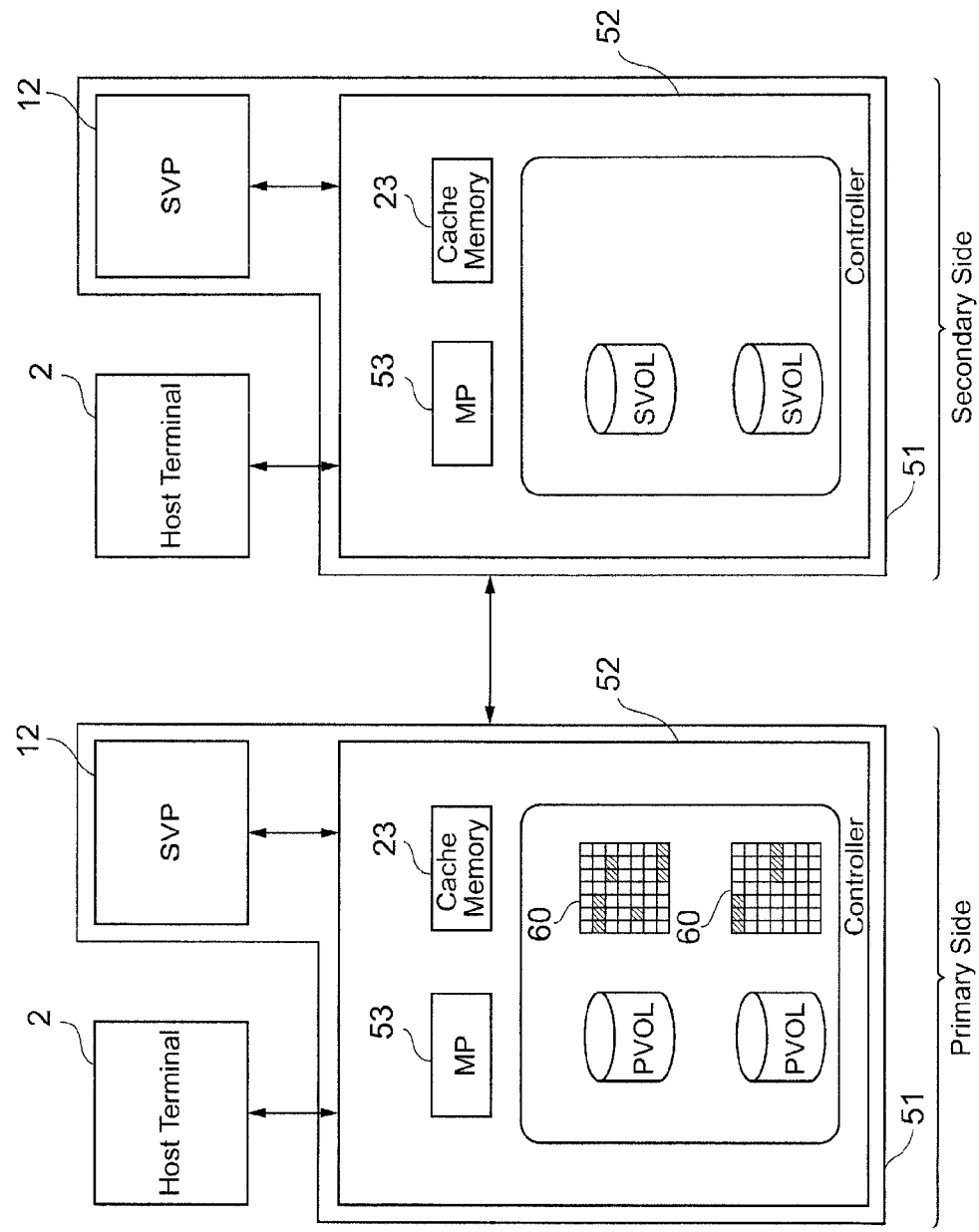
[FIG. 14]

As a means for realizing remote copying in the case of this embodiment as shown in FIG. 14, one or more logical volumes (hereinafter referred to as the "primary volume(s)") PVOL to/from which the host terminal 2 writes/reads the user data, and a plurality of differential bitmaps 54, each of which is associated with each primary volume PVOL, are created in the storage apparatus 51 on the primary side, while one or more logical volumes (hereinafter referred to as the "secondary volume(s)") SVOL, each of which is associated with each primary volume PVOL, are created in the storage apparatus 51 on the secondary side.

Every time the user data is written to the primary volume PVOL, the storage apparatus 51 on the primary side creates journal data. The journal data herein means update history information about the relevant primary volume PVOL, which is constituted from, for example, the volume number of the primary volume PVOL to which the user data is written, the address in the primary volume PVOL at which the user data is written, and the sequence number indicating the order of update.

The storage apparatus 51 on the primary side sets a bit corresponding to the storage area where the user data is written in the primary volume PVOL, from among bits in the differential bitmap 54 associated with that primary volume PVOL, to on ("1"). Then, the storage apparatus 51 on the primary side sends the user data stored in the storage area, whose bit corresponding to the differential bitmap 54 is on, in the primary volume PVOL and the journal data corresponding to this user data to the storage apparatus 51 on the secondary side at a later time.

On the other hand, after receiving the user data and the journal data, the storage apparatus 51 on the secondary side sequentially writes the received user data to the corresponding secondary volume SVOL by referring to the corresponding journal data.

As a result, the user data written to the primary volume PVOL is then reflected in the secondary volume SVOL and backup data of the primary volume PVOL is stored in the secondary volume SVOL.

When the storage apparatus 51 on the primary side writes the user data from the host terminal 2 to the corresponding primary volume PVOL, one of characteristics of this embodiment in relation to remote copying is that the user data is temporarily stored in the volatile memory module 232 for the cache memory 23, and the journal data is stored and retained in the nonvolatile memory 233 until it is transferred to the storage apparatus 51 on the secondary side.

Accordingly, the computer system 50 according to this embodiment makes it possible to prevent waste of the volatile memory module 232 and reduce the amount of data, which has been stored in the volatile memory module 232 at the time of power shutdown of the storage apparatus 51 on the primary side, to be saved to the nonvolatile memory 233 by storing and retaining the journal data, which will not be accessed until it is transferred to the secondary side, in the nonvolatile memory 233 for the cache memory 23.

Figure 15:
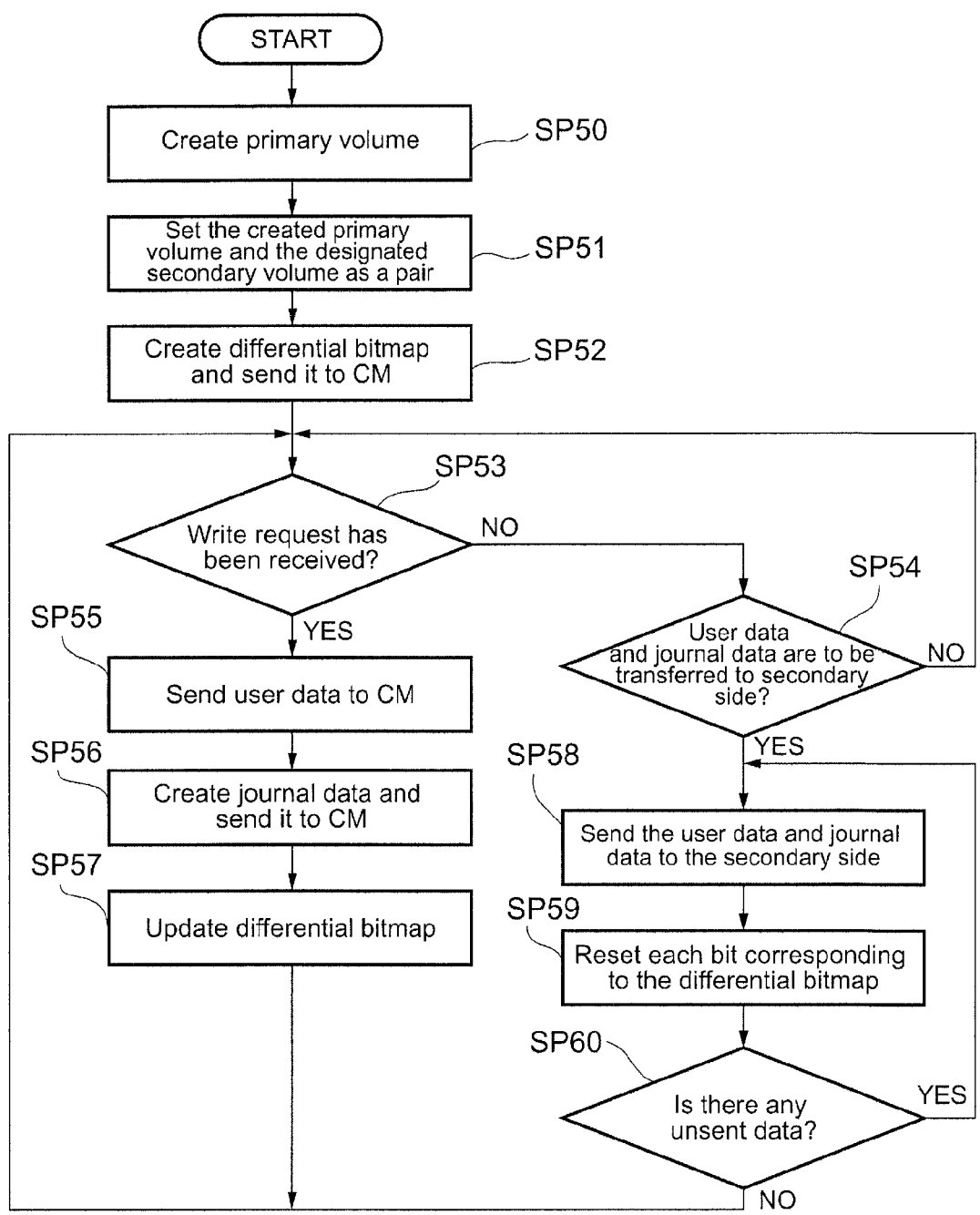
[FIG. 15]

FIG. 15 shows a processing sequence for remote copy processing executed by the microprocessor 53 (FIG. 13) for the controller 52 (FIG. 13) in the storage apparatus 51 on the primary side in association with the above-described remote copy function.

The microprocessor 53 creates a primary volume PVOL (FIG. 14) in accordance with the remote copy processing shown in FIG. 15 and performs remote copying of the user data written to the created primary volume PVOL and its journal data to the storage apparatus 51 on the secondary side.

Specifically speaking, when the system administrator operates the SVP 12 to command the creation of a primary volume PVOL, the microprocessor 53 starts this remote copy processing and first creates the primary volume PVOL then designated by the system administrator (SP50).

Subsequently, the microprocessor 53 sets the created primary volume PVOL as a copy pair with the secondary volume SVOL (FIG. 14) designated by a system administrator in the storage apparatus 51 which is designated by the system administrator as the secondary side (SP51). The copy pair herein means a pair of a primary volume PVOL and a secondary volume SVOL between which remote copying is performed.

Next, the microprocessor 53 creates a differential bitmap 54 corresponding to that primary volume PVOL, packetizes data of the created differential bitmap 54, and sends it to the cache memory 23. As a result, the differential bitmap 54 is then stored in the cache memory 23 in accordance with the aforementioned processing sequence with reference to FIG. 9 (SP52). Incidentally, since the data type distinction information as the control data whose update frequency is high is set to the differential bitmap 54, the differential bitmap 54 is stored in the nonvolatile memory 233 for the cache memory 23.

Preparation for remote copying is completed as a result of steps SP50 through SP52. Then, the microprocessor 53 waits for the time when the host terminal 2 makes a write request to the primary volume PVOL or when the user data and its journal data should be transferred to the secondary side (SP53, SP54).

When any of the host terminals 2 makes a write request to the primary volume PVOL or gives user data to write (SP53: YES), the microprocessor 53 controls the channel adapter 21 to transfer the received the user data to the cache memory 23 (SP55). As a result, the user data is packetized by the channel adapter 21 (FIG. 13) and sent to the cache memory 23.

Next, the microprocessor 53 creates journal data for that user data, packetizes the created journal data, and sends it to the cache memory 23 (SP56). Regarding the packet which stores the journal data, the microprocessor 53 stores the data type distinction information, which indicates that it is the control data whose update frequency is low, as the aforementioned data type distinction information to be stored in the source information field 312 in the header field 31. As a result, the journal data is then stored in the nonvolatile memory 233 for the cache memory 23 in accordance with the aforementioned procedure with reference to FIG. 9 (SP56).

Subsequently, the microprocessor 53 updates all the bits corresponding to the storage area in the primary volume PVOL where the user data is stored, from among the bits associated with the primary volume PVOL in the differential bitmap 54, to on ("1") (SP57), and then returns to step SP53.

Meanwhile, when the time to send the user data written to the primary volume PVOL to the secondary side has come (step SP54: YES), the microprocessor 53 refers to the differential bitmap 54, controls the disk adapter 25 (FIG. 13) to read the user data, which has been newly written to the primary volume PVOL after sending the previous user data and other data to the secondary side, from the disk device 10, reads the journal data corresponding to that user data from the cache memory 23, and sends such user data and journal data to the storage apparatus 51 on the secondary side (SP58).

The microprocessor 53 then resets each bit corresponding to the storage area in the primary volume PVOL where the user data sent to the storage apparatus 51 on the secondary side in step SP58 was stored, from among the bits in the differential bitmap 54 (i.e., changes the relevant bit to "0") (SP59). Subsequently, the microprocessor 53 refers to the differential bitmap 54 and judges whether there is any user data and other data which have not been sent to the secondary side yet (SP60).

If a negative judgment is returned in SP60, the microprocessor 53 returns to step SP53 and then repeats the loop of step SP58 through step SP60 and then back to step SP58.

When the microprocessor 53 finishes sending the entire user data and journal data newly written to the primary volume PVOL after sending the previous user data and other data to the secondary side and if a negative judgment is thereby returned in SP60, the microprocessor 53 returns to step SP53; and then the next write request is made and the microprocessor 53 waits for the next timing to send the next user data and other data to the secondary side.

The computer system 50 according to this embodiment is designed as described above so that the journal data is stored and retained in the nonvolatile memory 233 for the cache memory 23. Therefore, it is possible to prevent waste of the volatile memory module 232 and also reduce the amount of data, which has been stored in the volatile memory module 232 at the time of power shutdown of the storage apparatus 51 on the primary side, to be saved to the nonvolatile memory 233.

As a result, this computer system 50 can prevent waste of the volatile memory module 232, enhance accessibility to the user data and the control data whose update frequency is high, and significantly reduce the data save time at the time of power shutdown and the data recovery time at the time of power reactivation.

(3) Third Embodiment

Figure 17:
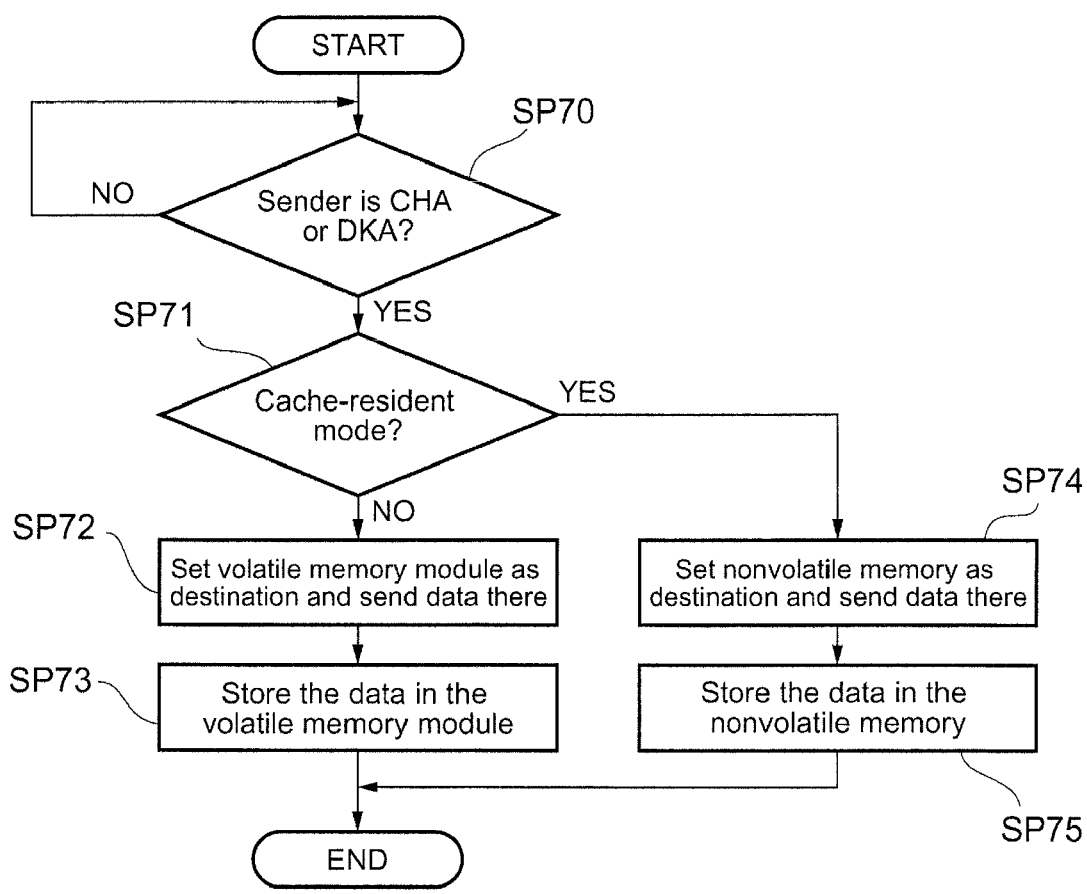
[FIG. 17]

FIG. 17, which indicates elements corresponding to those in FIG. 1 by giving them the same reference numerals as those in FIG. 1, shows a computer system 60 according to the third embodiment. This computer system 60 is configured in the same manner as the computer system 1 according to the first embodiment, except that a storage apparatus 61 has a cache-resident function in addition to the aforementioned virtualization function.

Figure 16:
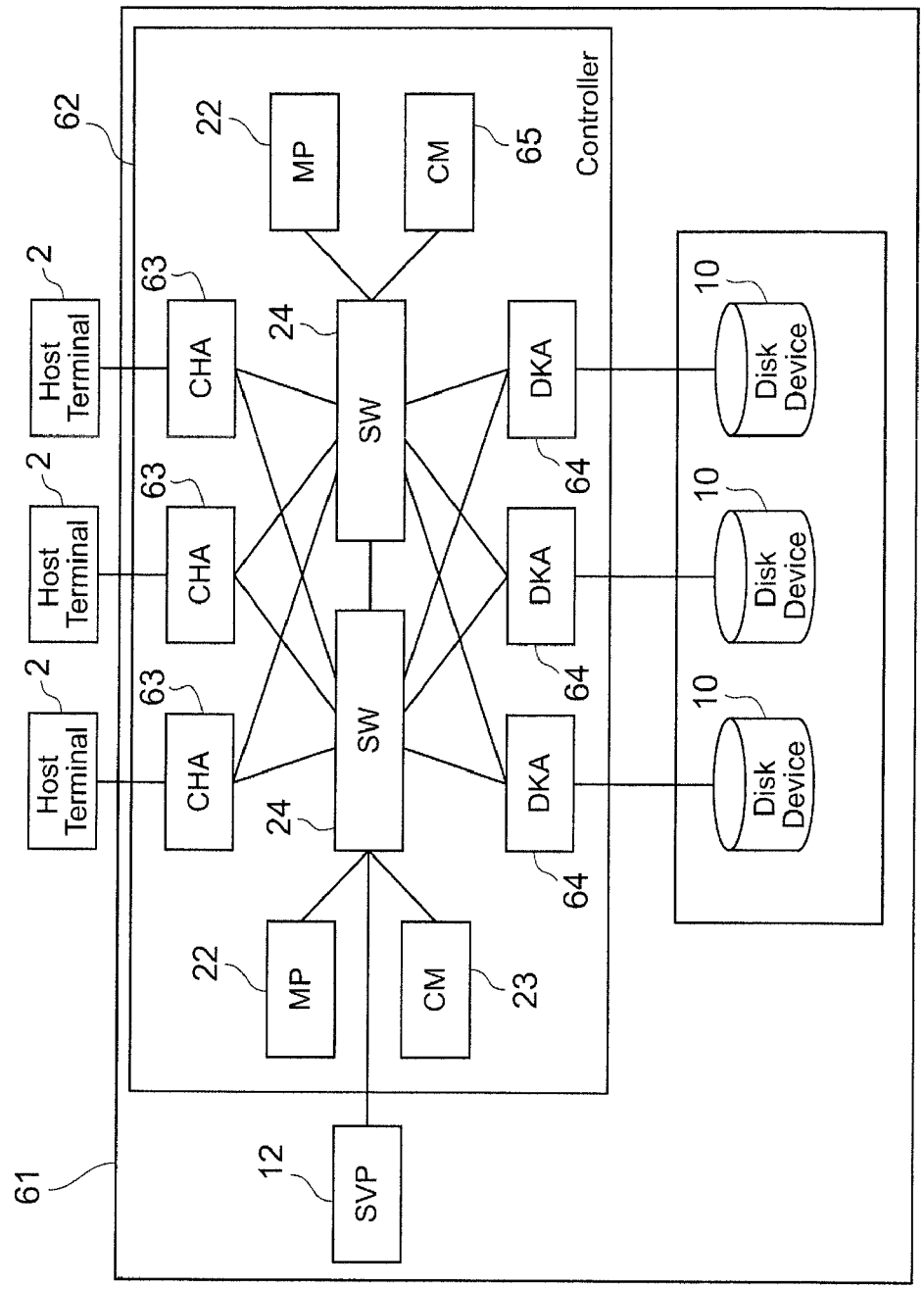
[FIG. 16]

Specifically speaking, in the case of the computer system 60 according to this embodiment, the cache-resident mode in which the user data is made resident on the cache memory 65 (FIG. 16) for the controller 62 can be set to the user data by having the user use the host terminal 2 when writing the user data to the storage apparatus 61 or by having the system administrator use the SVP with regard to the user data already written to the storage apparatus 61.

In this case, the channel adapter 63 or the disk adapter 64 for the controller 62 stores information indicating that the cache-resident mode is set (hereinafter referred to as the "cache-resident information") in the destination information field 311 in the header field 31 (FIG. 2) of the packet 30 (FIG. 3) which stores the user data to which the cache-resident mode is set.

The storage apparatus 61 is designed so that the user data to which the cache-resident mode is set is stored and retained in the nonvolatile memory 233 for the cache memory 65, while the user data to which the cache-resident mode is not set is stored and retained in the volatile memory module 232 for the cache memory 65.

With the computer system 60 according to this invention as described above, it is possible to reduce the amount of data to be saved from the volatile memory module 232 to the nonvolatile memory 233 at the time of power shutdown and the amount of data to be returned from the nonvolatile memory 233 to the volatile memory module 232 at the time of restoration from the power shutdown by storing and retaining the user data, which is resident on the cache memory 65, in the nonvolatile memory 233.

FIG. 17 shows a processing sequence for data sorting processing executed by the cache memory 65 in association with the cache-resident function. The cache memory 65 sorts the user data, to which the cache-resident mode is set, into the nonvolatile memory 233 in accordance with the processing sequence in FIG. 17.

Specifically speaking, after the packet transmitter-receiver 6511 (FIG. 4) for the memory control circuit 651 (FIG. 3) in the cache memory 65 receives the packet 30, it starts this data sorting processing and first judges based on the sender stored in the header field 31 of the received packet 30 whether the sender of the packet 30 is either one of the channel adapter 63 and the disk adapter 64 (SP70).

If an affirmative judgment is returned in SP70, the packet transmitter-receiver 6511 refers to the destination information field 311 in the header field 31 of the packet 30 and then judges whether or not the cache-resident mode is set to the user data (SP71).

If an affirmative judgment is returned in SP71, the packet transmitter-receiver 6511 sets the volatile memory module 232 as the destination of the packet 30 and sends the packet 30 to the volatile memory control unit 2313 (FIG. 4) (SP72). Finally, the volatile memory control unit 2313 stores this packet 30 in the volatile memory module 232 (SP73).

On the other hand, if a negative judgment is returned in step SP71, the packet transmitter-receiver 6511 sets the nonvolatile memory 233 as the destination of the packet 30 and sends this packet 30 to the nonvolatile memory control unit 2315 (FIG. 4) (SP74). As a result, the nonvolatile memory control unit 2315 stores this packet 30 in the packet buffer 2314 (FIG. 4); and then later when a certain amount of data has been accumulated, the nonvolatile memory control unit 2315 stores the user data, which is stored in the packet 30, in the nonvolatile memory 233 (SP75).

With the storage apparatus 61 in the computer system 50 according to this embodiment as described above, the user data which is resident on the cache is stored and retained in the nonvolatile memory 233. Therefore, it is possible to reduce the amount of data to be saved from the volatile memory module 232 to the nonvolatile memory 233 at the time of power shutdown and the amount of data to be returned from the nonvolatile memory 233 to the volatile memory module 232 at the time of power reactivation thereafter. As a result, the data save time and the data recovery time can be shortened as compared to the conventional techniques.

(4) Fourth Embodiment

Figure 18:
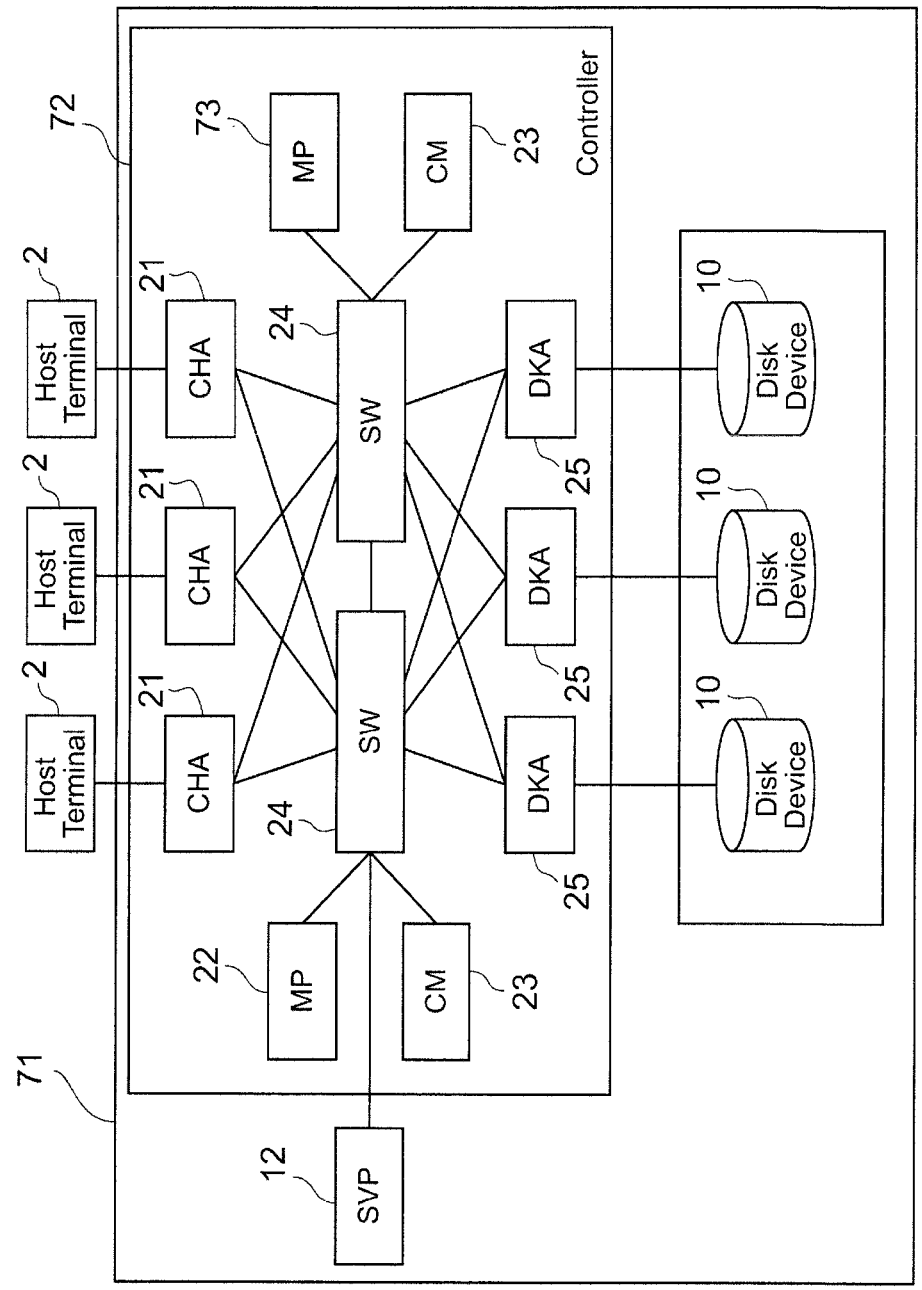
[FIG. 18]

FIG. 18, which indicates elements corresponding to those in FIG. 1 by giving them the same reference numerals as those in FIG. 1, shows a computer system 70 according to the fourth embodiment. This computer system 70 is configured in the same manner as the computer system 1 according to the first embodiment, except that the computer system 70 has a control data storage location switching function that switches the storage location of control data dynamically between the nonvolatile memory 233 and the volatile memory module 232 in the cache memory 23 according to the update frequency of the control data.

Specifically speaking, the storage apparatus 71 retains, for each of the logical devices LDEV constituting the pool volume PLVOL described with reference to FIG. 7, control data for managing what kind of data is stored at which address position in the relevant logical device LDEV (hereinafter referred to as the "stored data management information").

For example, when the user data stored in the cache memory 23 is to be migrated to the corresponding logical device LDEV (more precisely, the corresponding disk device 10) at the time of a cache write error or the user data to be read is to be migrated from the logical device LDEV (more precisely, the corresponding disk device 10) to the cache memory 23 at the time of a cache read error in the case of the storage apparatus 71 according to this embodiment, and if the update frequency of the stored data management information about the logical device LDEV is high, the stored data management information is stored and retained in the volatile memory module 232 for the cache memory 23; or otherwise, the stored data management information is stored and retained in the nonvolatile memory 233 for the cache memory 23.

In this way, this computer system 70 can enhance accessibility of the microprocessor 73 to the stored data management information by dynamically switching the storage location of the stored data management information in the cache memory 23 between the volatile memory module 232 and the nonvolatile memory 233 according to the update frequency of the stored data management information.

Figure 19:
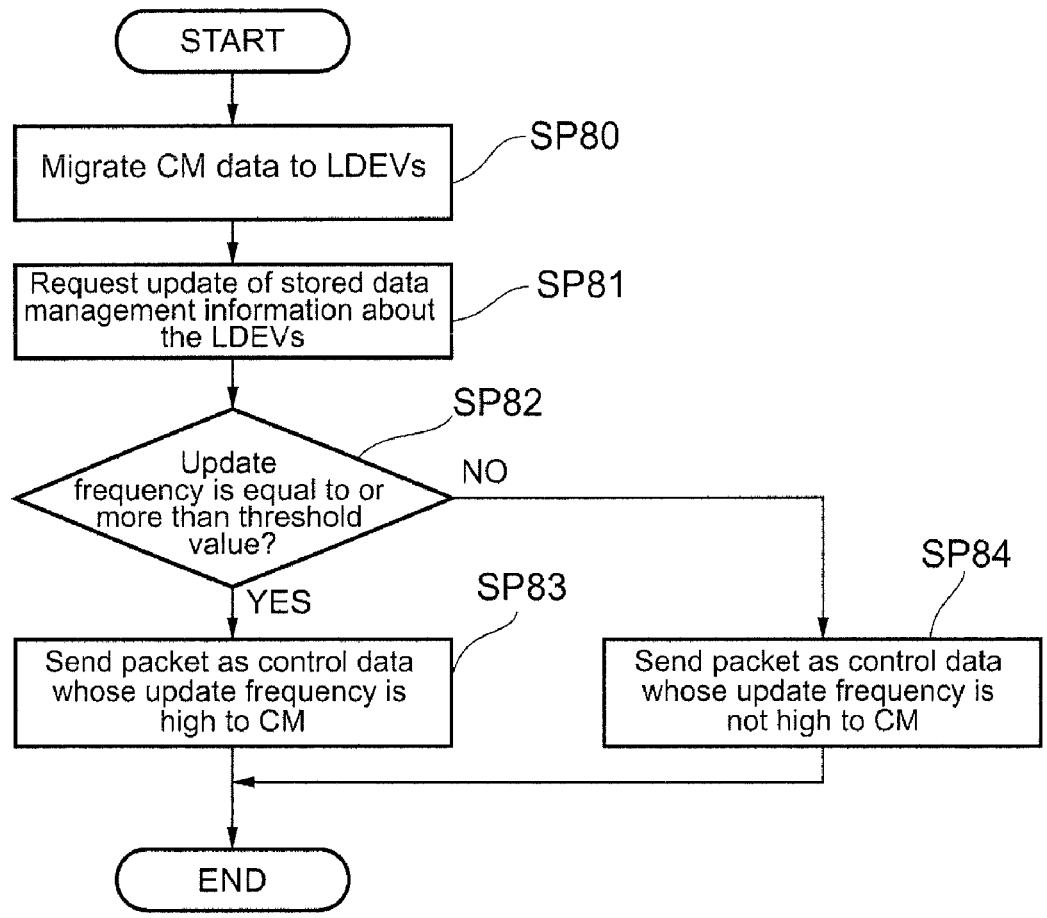
[FIG. 19]

FIG. 19 shows a processing sequence for cache write error processing executed by the microprocessor 73 for the controller 72 when a cache write error occurs in association with the above-described control data the storage location switching function.

If a cache write error that is a failure to store the user data to be written to or read from the cache memory 23 occurs due to shortage of the remaining capacity of the cache memory 23, the microprocessor 73 starts this cache write error processing and first controls the cache memory 23 and the disk adapter 25 so that data (the user data and/or the control data) stored respectively in the volatile memory module 232 and the nonvolatile memory 233 for the cache memory 23 will be migrated to their respective corresponding logical devices LDEVs (more specifically, the disk devices 10 constituting the logical devices LDEVs) (SP80).

Subsequently, the microprocessor 22 updates the stored data management information about the logical devices LDEVs to which the data has been migrated as described above. The microprocessor 22 counts the number of updates of the stored data management information about each logical device LDEV. If the stored data management information is updated as described above, a count value indicating the number of updates of the stored data management information is incremented by one (SP81).

Next, the microprocessor 73 judges whether the number of updates of the stored data management information as a result of the update in step SP81 is equal to or more than a predetermined threshold value (hereinafter referred to as the "threshold value for the number of updates") (SP82).

If an affirmative judgment is returned in SP82, the microprocessor 73 packetizes and sends the updated stored data management information to the cache memory 23. In doing so, the microprocessor 73 stores the above-mentioned data type distinction information, indicating that the stored data management information is the control data whose update frequency is high, in the source information field 312 (FIG. 2) in the header field 31 (FIG. 2) of a packet 30 and then sends this packet 30 to the cache memory 23 (SP83). As a result, the stored data management information stored in the packet 30 is stored in the volatile memory module 232 for the cache memory 23 by means of the data sorting storage processing explained earlier with reference to FIG. 9.

On the other hand, if a negative judgment is returned in step SP82, the microprocessor 73 packetizes and sends the updated stored data management information to the cache memory 23. In doing so, the microprocessor 73 sends the packet 30 to the cache memory 23 without storing the data type distinction information in the source information field 312 in the header field 31 of the packet 30 (SP84). As a result, the stored data management information stored in this packet 30 is stored in the nonvolatile memory 233 for the cache memory 23 by means of the data sorting storage processing explained earlier with reference to FIG. 9.

The microprocessor 73 then terminates this cache write error processing.

Figure 20:
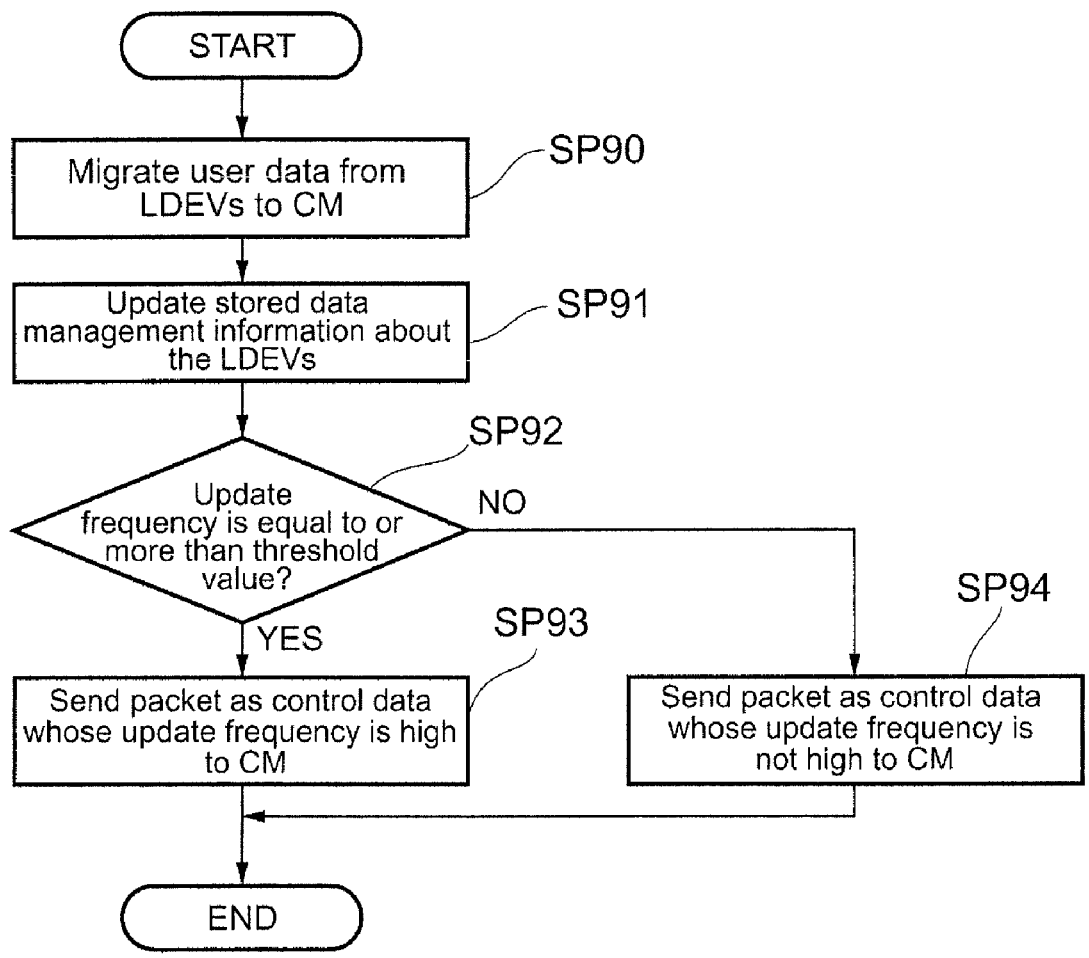
[FIG. 20]

Meanwhile, FIG. 20 shows a processing sequence for cache read error processing executed by the microprocessor 73 when a cache read error occurs in association with the control data storage location switching function described above.

Specifically speaking, when the host terminal 2 makes a user data read request, and if a cache read error caused by no existence of the relevant user data in the cache memory 23 occurs, the microprocessor 73 starts this cache read error processing and first controls the cache memory 23 and the corresponding disk adapter 25 so that the user data will be read out to the cache memory 23 in response to the read request (SP90).

Next, the microprocessor 73 updates the stored data management information about the logical device LDEV, from which the user data has been read, and increments the count value for the number of updates of the stored data management information by one (SP91).

Subsequently, the microprocessor 73 judges whether the number of updates of the stored data management information as a result of the update in step SP91 is equal to or more than the above-mentioned threshold value for the number of updates (SP92).

If an affirmative judgment is returned in SP92, the microprocessor 73 packetizes and sends the updated stored data management information to the cache memory 23. In doing so, the microprocessor 73 stores the above-mentioned data type distinction information, indicating that the stored data management information is the control data whose update frequency is high, in the source information field 312 in the header field 31 of a packet 30 and then sends this packet 30 to the cache memory 23 (SP93). As a result, the stored data management information stored in the packet 30 is stored in the volatile memory module 232 for the cache memory 23 by means of the data sorting storage processing explained earlier with reference to FIG. 9.

On the other hand, if a negative judgment is returned in step SP92, the microprocessor 73 packetizes and sends the updated stored data management information to the cache memory 23. In doing so, the microprocessor 73 sends the packet 30 to the cache memory 23 without storing the data type distinction information in the source information field 312 in the header field 31 of the packet 30 (SP94). As a result, the stored data management information stored in this packet 30 is stored in the nonvolatile memory 233 for the cache memory 23 by means of the data sorting storage processing explained earlier with reference to FIG. 9.

The microprocessor 73 then terminates this cache read error processing.

With the computer system 70 according to this embodiment described above, the storage location of the stored data management information in the storage apparatus 71 is switched between the nonvolatile memory 233 or the volatile memory module 232 in the cache memory 23 according to the update frequency. Therefore, the stored data management information of high update frequency is stored and retained in volatile memory module 232 whose access speed is high, and other stored data management information is stored and retained in the nonvolatile memory 233 whose access speed is lower than that of the volatile memory module 232. As a result, in addition to the advantageous effects of the first embodiment, it is possible to obtain the advantageous effect of enhancing accessibility of the microprocessor 73 to the stored data management information.

(5) Other Embodiments

The aforementioned first to fourth embodiments have described the case where the present invention is used for the storage apparatus 3, 51, 61, 71 configured as shown in FIG. 1, FIG. 13, FIG. 16, or FIG. 18. However, the invention is not limited to these examples, and can be used for a wide variety of storage apparatuses having other various configurations.

Also, the aforementioned first to fourth embodiments have described the case where the packet format of the packet 30 exchanged within the storage apparatus 3, 51, 61, 71 is as shown in FIG. 2. However, the packet format is not limited to this example, and other various packet formats can be widely used.

Furthermore, the aforementioned second embodiment has described the case where the primary volume PVOL is a substantial logical volume. However, the invention is not limited to this example, and the invention can be applied to the case where the primary volume PVOL is a virtual volume.

[Industrial Applicability]

The present invention can be widely used for a storage apparatus that has a cache memory constituted from a volatile memory and a nonvolatile memory and stores and retains control data in the cache memory.

The invention claimed is:

1. A storage apparatus for providing a host system with a storage area, wherein user data is read from or written to the storage area, the storage apparatus comprising:
   one or more disk devices for providing the storage area; and
   a controller,
   wherein the controller comprises:
      a channel adapter serving as an interface with the host system;
      a disk adapter serving as an interface with the one or more disk devices;
      a processor for controlling reading/writing the user data from/to the one or more disk devices; and
      a cache memory for storing the user data sent and received between the channel adapter and the disk adapter and control data used by the processor,
   wherein the cache memory includes:
      a nonvolatile memory;
      a volatile memory; and
      a memory control circuit for controlling reading/writing the user data or the control data from/to the nonvolatile memory and the volatile memory,
   wherein the memory control circuit sorts and stores at least the control data in the nonvolatile memory when an update frequency of the control data is high and sorts and stores at least the control data in the volatile memory when the update frequency of the control data is low,
   wherein a determination of whether the update frequency is high or low is based on pre-designated information regarding a data type of the control data,
   wherein the memory control circuit comprises a nonvolatile memory control unit, which retains a mapping table that associates a first address with a second address,
   wherein the first address is an address of a storage area in the nonvolatile memory as recognized by the processor, and the second address is an address of the storage area in the nonvolatile memory as recognized by the nonvolatile memory control unit, and
   wherein when the nonvolatile memory control unit receives a packet including the first address, the nonvolatile memory control unit refers to the mapping table, converts the first address contained in the packet into the second address, and stores the user data or the control data, to which the first address is added at the position of the second address in the nonvolatile memory.

2. The storage apparatus according to claim 1, further comprising:

a control unit for saving data, which has been stored in the volatile memory, to the nonvolatile memory at the time of power shutdown or returning the data, which has been saved to the nonvolatile memory, to the volatile memory at a time of power reactivation.

3. The storage apparatus according to claim 1, wherein where the control data should be sorted is decided in advance according to use frequency of the control data.

4. The storage apparatus according to claim 3, wherein the memory control circuit sorts and stores the user data and the control data of high use frequency into the volatile memory; and sorts and stores remaining control data into the nonvolatile memory.

5. The storage apparatus according to claim 1, wherein when the storage apparatus performs remote copying to another storage apparatus, every time the user data is written to the storage area, the processor creates journal data made of update history information about the storage area and controls the cache memory so that the created journal data is stored and retained in the nonvolatile memory.

6. The storage apparatus according to claim 1, wherein the processor controls the cache memory so that the user data designated to be resident in the cache memory is stored and retained in the nonvolatile memory.

7. The storage apparatus according to claim 1, wherein the processor controls the cache memory so that a storage location of the control data in the cache memory is dynamically switched between the volatile memory and the nonvolatile memory according to update frequency of the control data.

8. The storage apparatus according to claim 7, wherein if the update frequency of the control data is equal to or more than a predetermined threshold value, the processor stores the control data in the volatile memory; and if the update frequency of the control data is less than the threshold value, the processor stores the control data in the nonvolatile memory.

9. The storage apparatus according to claim 1, wherein the control data is an address map.

10. A control method for a storage apparatus for providing a host system with a storage area, wherein user data is read from or written to the storage area, wherein the storage apparatus includes:
one or more disk devices for providing the storage area; and
a controller,
wherein the controller comprises:
a channel adapter serving as an interface with the host system;
a disk adapter serving as an interface with the one or more disk devices;
a processor for controlling reading/writing the user data from/to the one or more disk devices; and
a cache memory for storing the user data sent and received between the channel adapter and the disk adapter and control data used by the processor, the cache memory comprising a nonvolatile memory; a volatile memory; and a memory control circuit for controlling reading/writing the user data or the control data from/to the nonvolatile memory and the volatile memory, and the memory control circuit comprising a nonvolatile memory control unit, and
wherein the control method comprises:
a first step of sorting and storing at least the control data in the nonvolatile memory when an update frequency of the control data is high and sorts and stores at least the control data in the volatile memory when the update frequency of the control data is low; and
a second step of saving data, which has been stored in the volatile memory, in the nonvolatile memory at the time of power shutdown and returning the data, which has been saved to the nonvolatile memory, to the volatile memory at the time of power reactivation,
wherein a determination of whether the update frequency is high or low is based on pre-designated information regarding a data type of the control data,
wherein the memory control circuit comprises a nonvolatile memory control unit, which retains a mapping table that associates a first address with a second address,
wherein the first address is an address of a storage area in the nonvolatile memory as recognized by the processor, and the second address is an address of the storage area in the nonvolatile memory as recognized by the nonvolatile memory control unit, and
wherein when the nonvolatile memory control unit receives a packet including the first address, the nonvolatile memory control unit refers to the mapping table, converts the first address contained in the packet into the second address, and stores the user data or the control data, to which the first address is added at the position of the second address in the nonvolatile memory.

11. The control method according to claim 10, wherein where the control data should be sorted is decided in advance according to use frequency of the control data.

12. The control method according to claim 11, wherein in the first step, the user data and the control data of high use frequency are sorted into and stored in the volatile memory; and wherein the remaining control data is sorted into and stored in the nonvolatile memory.

13. The control method according to claim 10, wherein in the first step, when the storage apparatus performs remote copying to another storage apparatus, every time the user data is written to the storage area, journal data made of update history information about the storage area is created and the created journal data is stored and retained in the nonvolatile memory.

14. The control method according to claim 10, wherein in the first step, the user data designated to be resident in the cache memory is stored and retained in the nonvolatile memory.

15. The storage control method according to claim 10, wherein in the first step, a storage location of the control data in the cache memory is dynamically switched between the volatile memory and the nonvolatile memory according to update frequency of the control data.

16. The control method according to claim 15, wherein in the first step, if the update frequency of the control data is equal to or more than a predetermined threshold value, the control data is sorted into and stored in the volatile memory; and if the update frequency of the control data is less than the threshold value, the control data is sorted into and stored in the nonvolatile memory.

17. The control method according to claim 10, wherein the control data is an address map.

* * * * *

UNITED STATES PATENT AND TRADEMARK OFFICE
CERTIFICATE OF CORRECTION

| | | |
|---|---|---|
| PATENT NO. | : 8,255,624 B2 | Page 1 of 1 |
| APPLICATION NO. | : 12/668907 | |
| DATED | : August 28, 2012 | |
| INVENTOR(S) | : M. Fujii et al. | |

It is certified that error appears in the above-identified patent and that said Letters Patent is hereby corrected as shown below:

Title page, item (75) should read:

-- (75) Inventors: Masanori FUJII, Odawara (JP); Tsukasa NISHIMURA, Odawara (JP); Sumihiro MIURA, Odawara (JP); Hikari MIKAMI, Odawara (JP) --

Signed and Sealed this
Twenty-seventh Day of November, 2012

David J. Kappos
*Director of the United States Patent and Trademark Office*